US012738439B2

(12) United States Patent
Saito et al.

(10) Patent No.: US 12,738,439 B2
(45) Date of Patent: Sep. 15, 2026

(54) PROTECTIVE ELEMENT

(71) Applicant: DEXERIALS CORPORATION, Tochigi (JP)

(72) Inventors: Manabu Saito, Shimotsuke (JP); Yutaka Wada, Shimotsuke (JP); Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 201 days.

(21) Appl. No.: 18/688,669

(22) PCT Filed: Aug. 30, 2022

(86) PCT No.: PCT/JP2022/032612
§ 371 (c)(1),
(2) Date: Mar. 1, 2024

(87) PCT Pub. No.: WO2023/032990
PCT Pub. Date: Mar. 9, 2023

(65) Prior Publication Data

US 2024/0371591 A1 Nov. 7, 2024

(30) Foreign Application Priority Data

Sep. 3, 2021 (JP) ................................ 2021-144287
Aug. 4, 2022 (JP) ................................ 2022-124862

(51) Int. Cl.
*H01H 85/055* (2006.01)
*H01H 85/143* (2006.01)
*H01H 85/165* (2006.01)

(52) U.S. Cl.
CPC ........ *H01H 85/055* (2013.01); *H01H 85/143* (2013.01); *H01H 85/165* (2013.01)

(58) Field of Classification Search
CPC .. H01H 85/055; H01H 85/143; H01H 85/165; H01H 85/02; H01H 37/76;
(Continued)

(56) References Cited

U.S. PATENT DOCUMENTS 9,704,681 B2 * 7/2017 Fukuyama ........... H01H 39/006
10,128,074 B2 * 11/2018 Lorenzon ............. H01H 71/025
(Continued)

FOREIGN PATENT DOCUMENTS

EP 4040461 A1 8/2022
JP 5039381 Y 11/1975
(Continued)

OTHER PUBLICATIONS

Fukuda Sumihisa; Kanematsu Kenji; Kinoshita Kazuhisa; Nakamura Masato; Kimoto Shinya; Ito Shun, "Breaker Device", Oct. 1, 2020, Panasonic IP Man Corp., Entire Document (Translation of JP2020161468) (of record, cited in the IDS, including Original Document). (Year: 2020).*
(Continued)

*Primary Examiner* — Stephen S Sul
(74) *Attorney, Agent, or Firm* — Schwegman Lundberg & Woessner, P.A.

(57) ABSTRACT

A protective element includes a fuse element, an insulating case, a first terminal, and a second terminal, and also includes an insulating member disposed close to or in contact with the fuse element and having an opening portion or a separation portion formed therein, a shielding member configured to move downward to divide the fuse element, a pressing unit configured to press the shielding member downward, and a locking member configured to restrain downward the shielding member, wherein the shielding member has a convex portion that protrudes toward the fuse element, the convex portion has a tip end disposed at a lower
(Continued)

end portion of the convex portion and extends in a width direction, the tip end has a first inclined blade which extends downward as nearing one side in the width direction, and the first inclined blade overlaps a region half the length of the fuse element in the width direction.

9 Claims, 22 Drawing Sheets

(58) Field of Classification Search
CPC ........ H01H 39/00; H01H 85/08; H01H 85/12; H01H 85/175; H01H 85/18
See application file for complete search history.

(56) References Cited

U.S. PATENT DOCUMENTS

| | | | | |
|---|---|---|---|---|
| 11,996,252 | B2 * | 5/2024 | Gerlaud | H01H 39/006 |
| 2011/0102953 | A1 | 5/2011 | Bonilla et al. | |
| 2012/0194954 | A1 * | 8/2012 | Fukuyama | H01H 39/006<br>361/62 |
| 2015/0200065 | A1 * | 7/2015 | Koetter | H01H 85/0039<br>218/117 |
| 2020/0006030 | A1 | 1/2020 | Yoneda | |
| 2022/0084773 | A1 | 3/2022 | Yoneda et al. | |
| 2022/0285114 | A1 * | 9/2022 | Nakamura | H01H 39/00 |
| 2022/0319792 | A1 | 10/2022 | Yoneda | |

FOREIGN PATENT DOCUMENTS

| | | | |
|---|---|---|---|
| JP | 53110047 | A | 9/1978 |
| JP | 54045333 | U | 3/1979 |
| JP | 54073939 | U | 5/1979 |
| JP | 2009295567 | A | 12/2009 |
| JP | 2011181362 | A | 9/2011 |
| JP | 2017004634 | A | 1/2017 |
| JP | 2017515293 | A | 6/2017 |
| JP | 2020145051 | A | 9/2020 |
| JP | 2020161468 | A | 10/2020 |
| JP | 2021022431 | A | 2/2021 |
| JP | 2021061147 | A | 4/2021 |
| TW | 202129676 | | 8/2021 |
| WO | WO-2015168561 | A1 | 11/2015 |
| WO | WO-2018159283 | A1 | 9/2018 |
| WO | WO-2020179728 | A1 | 9/2020 |
| WO | WO-2021014909 | A1 | 1/2021 |

OTHER PUBLICATIONS

"International Application Serial No. PCT/JP2022/032152, International Search Report dated Nov. 1, 2022", w/ English Translation, (Nov. 1, 2022), 4 pgs.
"International Application Serial No. PCT/JP2022/032553, International Search Report dated Oct. 11, 2022", w/ English Translation, (Oct. 11, 2022), 6 pgs.
"International Application Serial No. PCT/JP2022/032612, International Search Report dated Nov. 8, 2022", w/ English Translation, (Nov. 8, 2022), 4 pgs.
"Taiwanese Application No. 111133171, Office Action dated Apr. 10, 2026", w English Translation, Apr. 10, 2026, 11 pgs.

* cited by examiner

PROTECTIVE ELEMENT

PRIORITY APPLICATIONS

This application is a U.S. National Stage Filing under 35 U.S.C. § 371 from International Application No. PCT/JP2022/032612, filed on Aug. 30, 2022, and published as WO2023/032990 on Mar. 9, 2023, which claims the benefit of priority to Japanese Patent Application No. 2021-144287, filed Sep. 3, 2021 and Japanese Patent Application No. 2022-124862, filed Aug. 4, 2022; the benefit of priority of each of which is hereby claimed herein, and which applications and publication are hereby incorporated herein by reference in their entireties.

TECHNICAL FIELD

The present invention relates to a protective element.

BACKGROUND ART

Conventionally, there is a fuse element that generates heat and fuses to cut off a current path when a current exceeding a rating flows through the current path. Protective elements (fuse devices) including fuse elements are used in a wide range of fields from home appliances to electric vehicles.

For example, lithium ion batteries are used in a wide range of applications from mobile devices to electric vehicles (EVs) and storage batteries, and their capacity is increasing. When the capacity of lithium-ion batteries increases, high voltage specifications of several hundred volts and high current specifications of several hundred amperes to several thousand amperes are required.

For example, Patent Document 1 describes a fuse element that includes two elements connected between terminal portions located at both end portions and a fusing portion provided approximately at a center of the element, as a fuse element mainly used in automotive electrical circuits, or the like. Patent Document 1 describes a fuse in which a set of two fuse elements is housed inside a casing, and an arc-extinguishing material is sealed between the fuse element and the casing.

CITATION LIST

Patent Document

[Patent Document 1]
Japanese Unexamined Patent Application, First Publication No. 2017-004634

SUMMARY OF INVENTION

Technical Problem

In a protective element installed in a current path of a high voltage and large current, when a fuse element is fused, arc discharge is likely to occur. When a large-scale arc discharge occurs, an insulating case in which the fuse element is housed may be destroyed. For this reason, metals such as copper, which have low resistance and a high melting point, are used as materials for fuse elements to curb occurrence of arc discharge. Furthermore, a robust and highly heat-resistant material such as a ceramic is used as a material of the insulating case, and a size of the insulating case is increased.

Furthermore, conventional current fuses for high voltage and large current (100 V/100 A or higher) are only capable of cutting off an overcurrent, and there is no current fuse that can simultaneously provide a cutoff function using a cutoff signal.

The present invention has been made in view of the above circumstances, and a first object thereof is to reliably cut off a current in a fuse element. Further, a second object is to provide a protective element capable of preventing large-scale arc discharge from occurring when the fuse element fuses, allowing a size and weight of an insulating case to be reduced, and also providing both cutoff of an overcurrent for high voltage and large current and a cutoff function using a cutoff signal.

Solution to Problem

The present invention provides the following means to solve the above problems.

[First Aspect of the Present Invention]

A protective element includes a fuse element, an insulating case configured to accommodate the fuse element, a first terminal and a second terminal, an insulating member disposed close to or in contact with the fuse element and having an opening portion or a separation portion formed therein, a shielding member disposed above the fuse element and configured to move downward while being inserted into the opening portion or the separation portion of the insulating member to divide the fuse element, a pressing unit configured to press the shielding member downward, and a locking member configured to restrain downward movement of the shielding member, wherein the fuse element has a first end portion and a second end portion disposed at both end portions in an energizing direction, one end portion of the first terminal being connected to the first end portion and the other end portion is exposed to an outside from the insulating case, and one end portion of the second terminal being connected to the second end portion and the other end portion is exposed to an outside from the insulating case, the shielding member has the opening portion or separation portion and a convex portion that protrudes toward the fuse element, the convex portion has a tip end which is disposed at a lower end portion of the convex portion and extends in a width direction, the tip end has a first inclined blade which extends downward as nearing one side in the width direction, and the first inclined blade overlaps a region which exceeds at least half of an entire length of the fuse element in the width direction when seen in an up-down direction.

[Second Aspect of the Present Invention]

In the protective element described in the first aspect, the first inclined blade may overlap the fuse element over an entire length in the width direction when seen in the up-down direction.

[Third Aspect of the Present Invention]

In the protective element described in the first aspect, the tip end may further have a second inclined blade which is disposed on one side in the width direction of the first inclined blade and extends downward as nearing the first inclined blade, and a protruding end which connects the first inclined blade and the second inclined blade and is convex downward, and the second inclined blade and the protruding end may overlap a part of the fuse element when seen in the up-down direction.

[Fourth Aspect of the Present Invention]

In the protective element described in any one of the first to third aspects, when seen in the energizing direction, an inclination angle of the first inclined blade with respect to a reference line which extends in the width direction may be 3° or more and 27° or less.

[Fifth Aspect of the Present Invention]

In the protective element described in any one of the first to fourth aspects, in a cross section perpendicular to the width direction, the tip end may have a V-shape convex downward, and a blade edge angle thereof may be 10° or more and 90° or less.

[Sixth Aspect of the Present Invention]

The protective element described in any one of the first to fifth aspects may further include a heat generating body configured to heat and soften the locking member or a fixing member which fixes the locking member, and a power supply member configured to supply a current to the heat generating body, and as the shielding member moves downward, at least a part of the locking member may be inserted into the opening portion or the separation portion together with the convex portion.

[Seventh Aspect of the Present Invention]

In the protective element described in the sixth aspect, the locking member may be a wire disposed above the opening portion or the separation portion and extending in the energizing direction, and supports the tip end from below, both end portions of the locking member in the energizing direction may be supported by a pair of support members, at least one of the pair of support members may be the heat generating body, and as the shielding member moves downward, one end portion of the locking member in the energizing direction may remain in a supported state, and the other end portion may be released from the supported state and may be inserted into the opening portion or the separation portion.

[Eighth Aspect of the Present Invention]

In the protective element described in the seventh aspect, a plurality of the locking members may be provided to be arranged in a width direction, and as the shielding member moves downward, one end portions of all of the locking member in the energizing direction may remain in a supported state, and the other end portion may be released from the supported state and may be inserted into the opening portion or the separation portion.

[Ninth Aspect of the Present Invention]

In the protective element described in any one of the first to eighth aspects, the tip end further may include a fitting groove provided in a lower surface of the tip end and extending in the up-down direction, and the locking member may be a wire disposed above the opening portion or the separation portion and extending in the energizing direction, and may be inserted into the fitting groove to support the tip end from below.

[Tenth Aspect of the Present Invention]

In the protective element described in the ninth aspect, a plurality of locking members may be provided to be arranged in the width direction, the fitting grooves may be provided in an identical number as or more than the locking members and may be provided to be arranged in the width direction, and positions of upper ends of each of the fitting grooves may be a same.

Advantageous Effects of Invention

According to the protective element of the present invention, a current can be reliably cut off in the fuse element. Further, according to the present invention, it is possible to provide a protective element capable of preventing large-scale arc discharge from occurring when the fuse element fuses, allowing a size and weight of the insulating case to be reduced, and also providing both cutoff of an overcurrent for high voltage and large current and a cutoff function using a cutoff signal.

DESCRIPTION OF EMBODIMENTS

Figure 1:
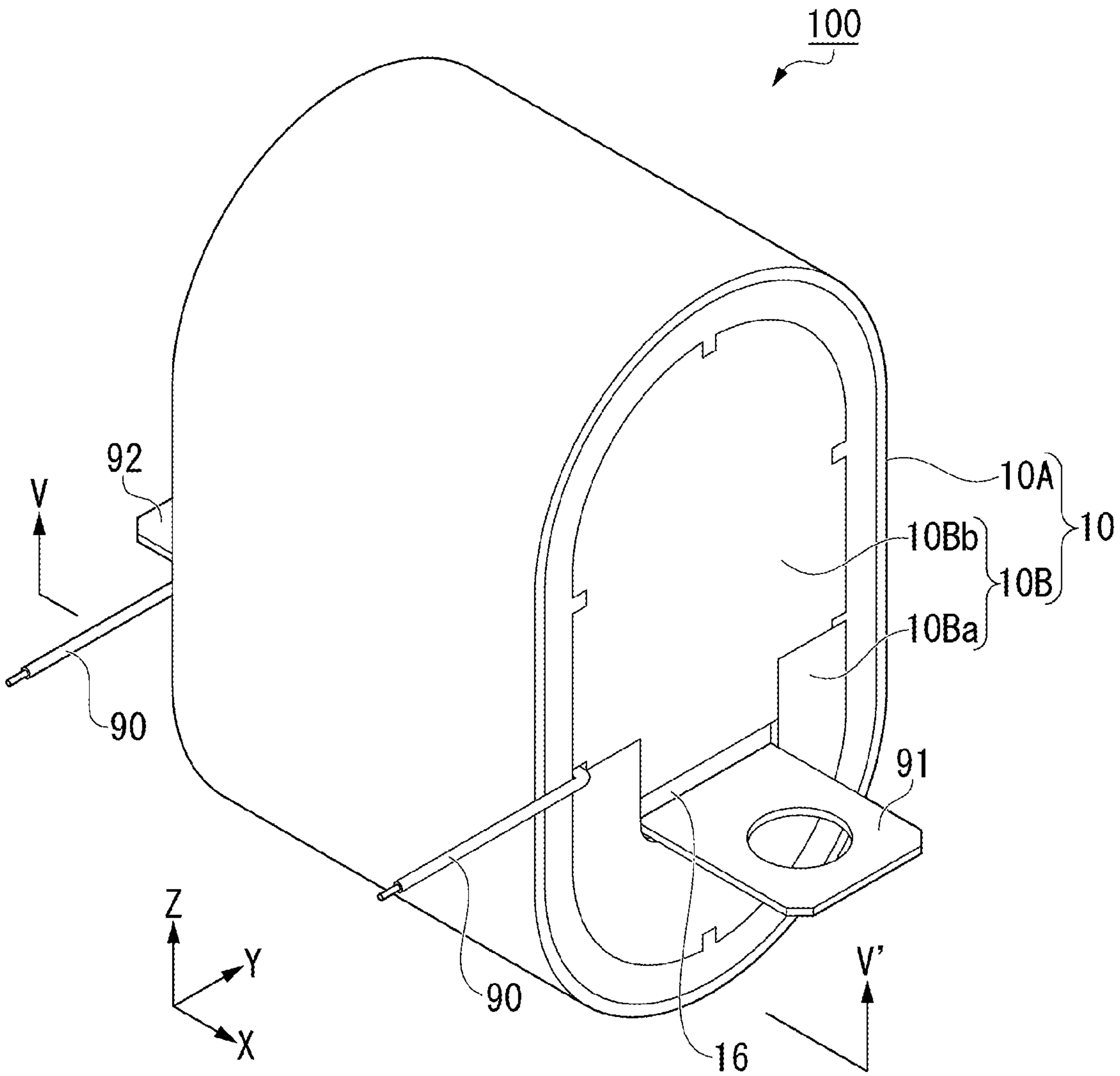
FIG. 1 is a perspective view of a protective element according to a first embodiment of the present invention.

Hereinafter, this embodiment will be described in detail with reference to the drawings as appropriate. In the drawings used in the following description, characteristic parts may be shown enlarged for convenience in order to make the characteristics easier to understand, and a dimensional ratio of each of components may be different from actual one. Materials, dimensions, and the like exemplified in the following description are merely examples, and the present invention is not limited thereto, and can be implemented with appropriate changes within the scope of achieving effects of the present invention.

(Protective Element (First Embodiment))

FIGS. 1 to 5 are schematic views showing a protective element according to a first embodiment of the present invention. In the drawings used in the following description, a direction indicated by X is an energizing direction of a fuse element. A direction indicated by Y is a direction perpendicular to the X direction, and is also referred to as a width direction. In this embodiment, one side in the width direction (the Y direction) corresponds to the −Y side, and the other side corresponds to the +Y side. However, the present invention is not limited thereto, and one side in the width direction may correspond to the +Y side, and the other side in the width direction may correspond to the −Y side. A direction indicated by Z is a direction perpendicular to the X direction and the Y direction, and is also referred to as a thickness direction. The thickness direction may also be referred to as an up-down direction. In the up-down direction (the Z direction), the upper side corresponds to the +Z side, and the lower side corresponds to the −Z side.

In this embodiment, the "upper side" and "lower side" are simply names used to describe a relative positional relationship of each part, and an actual arrangement relationship may be other than the arrangement relationship indicated by these names.

Figure 2:
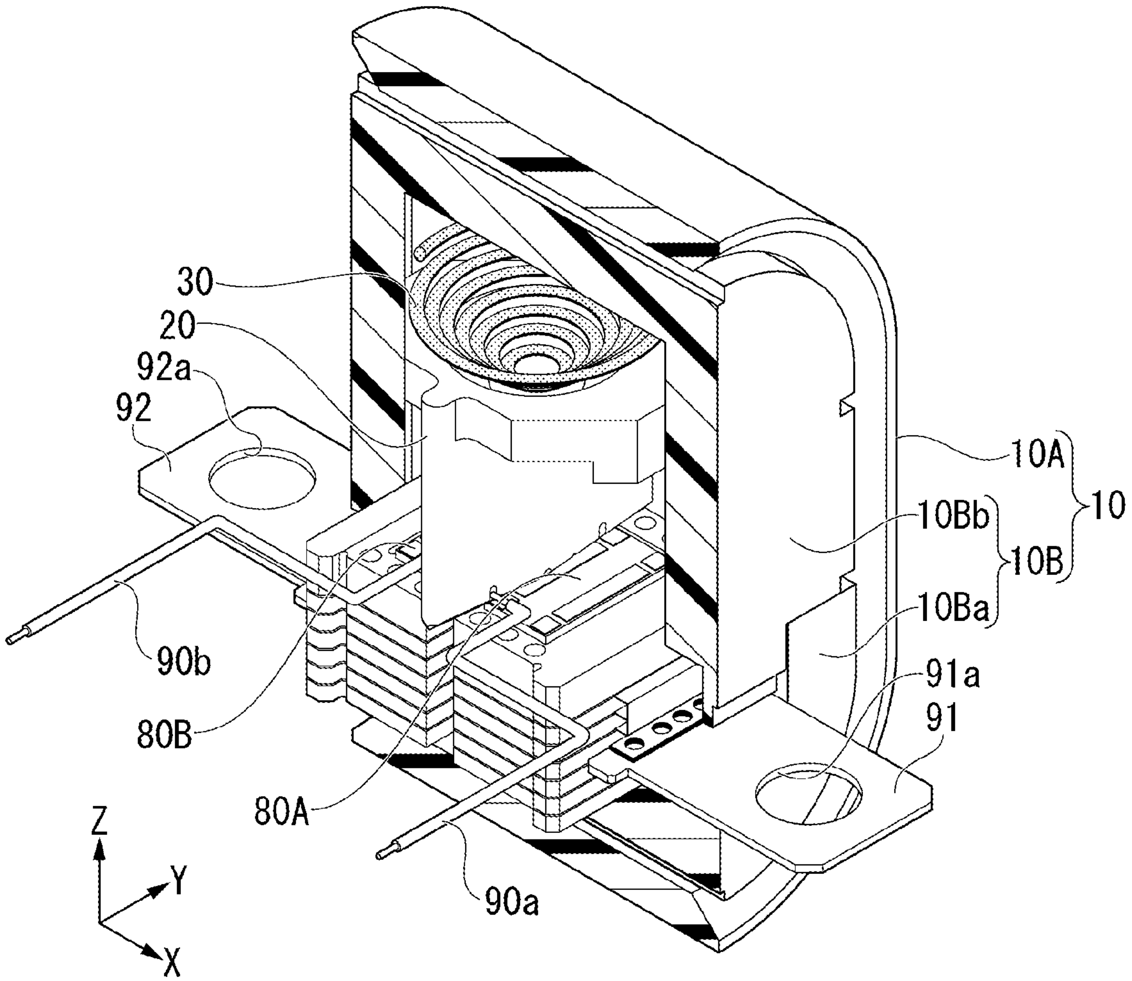
FIG. 2 is a perspective view with a part removed so that the inside of the protective element shown in FIG. 1 can be seen.
Figure 3:
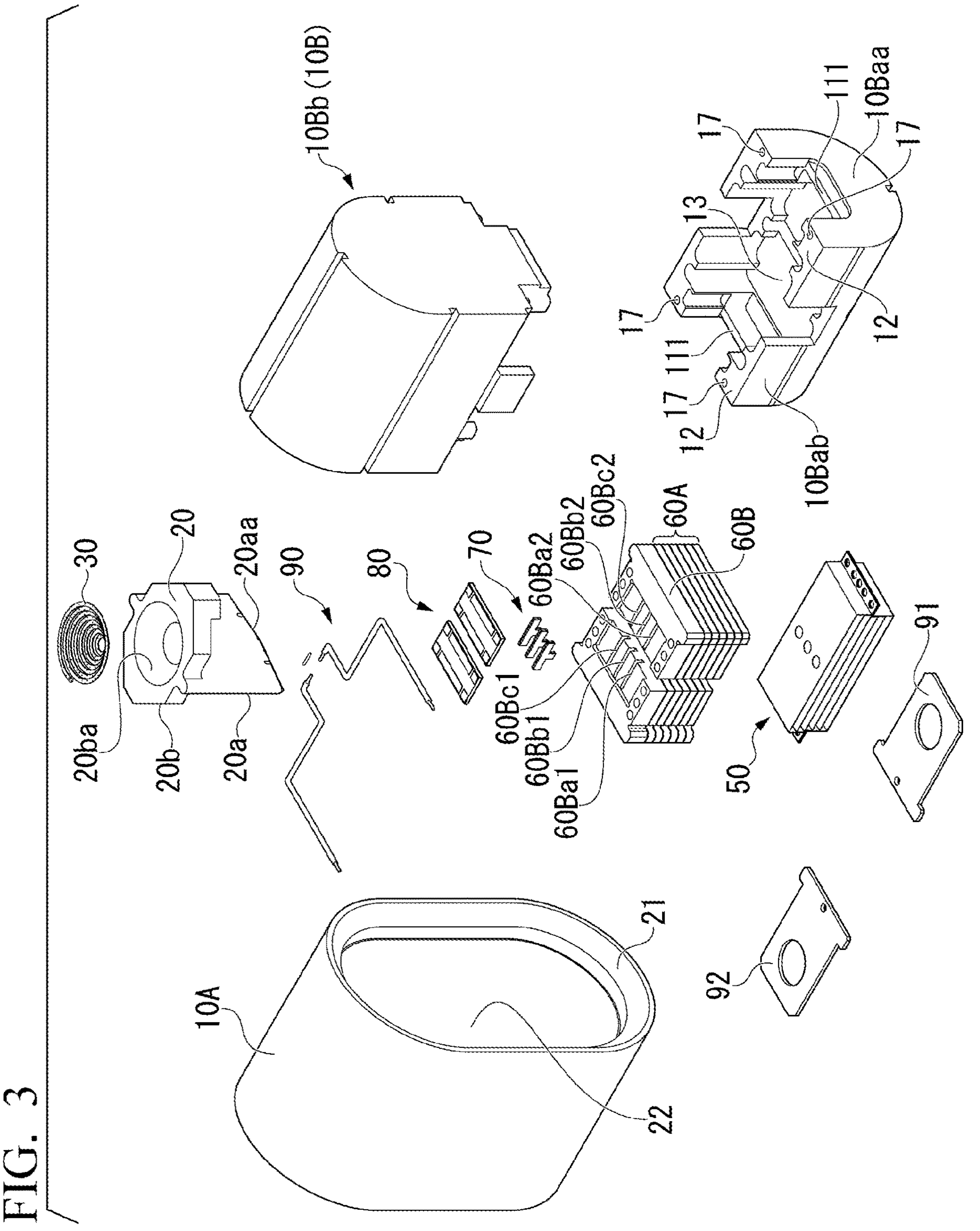
FIG. 3 is an exploded perspective view of the protective element shown in FIG. 1.
Figure 4A:
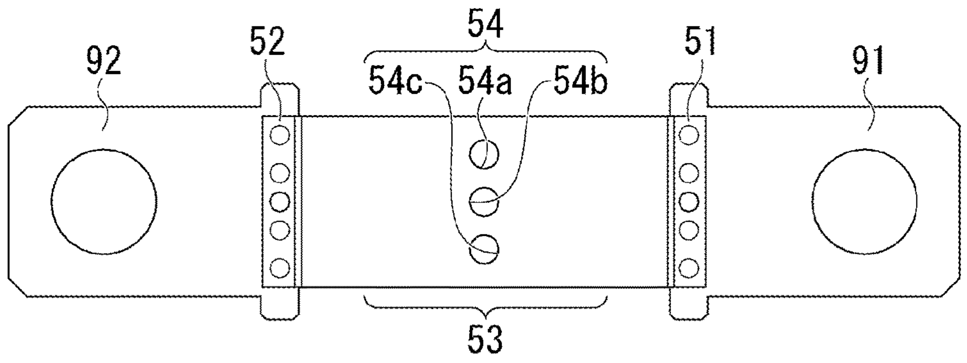
FIG. 4A is a plan view schematically showing a first terminal, a second terminal, and one fusible conductor sheet that constitutes a fuse element laminate.
Figure 4B:
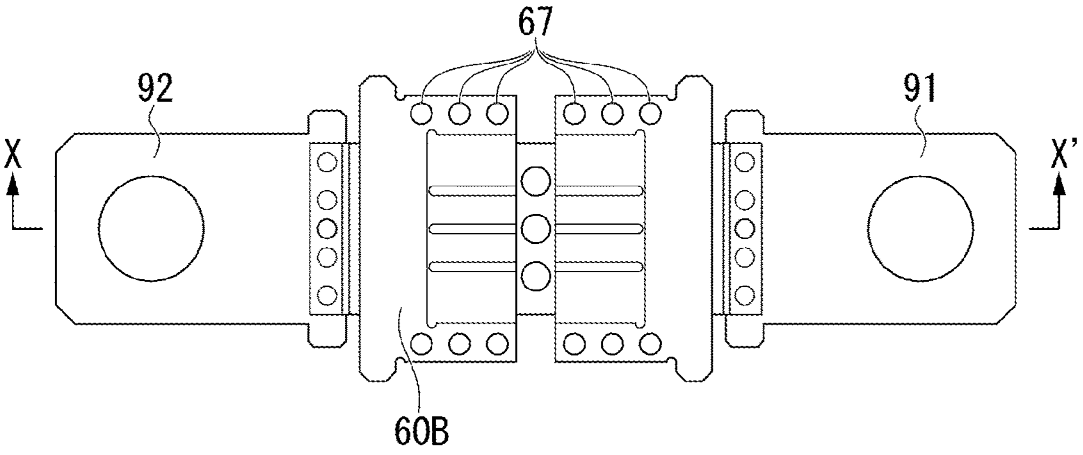
FIG. 4B is a plan view schematically showing a fuse element laminate, a second insulating member, a first terminal, and a second terminal.
Figure 4C:
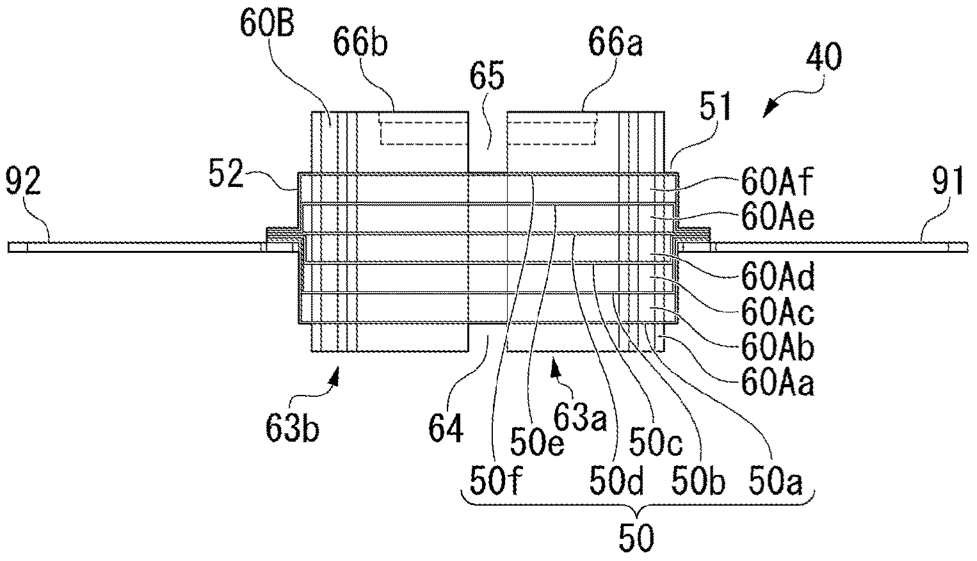
FIG. 4C is a cross-sectional view taken along line X-X' of the plan view shown in FIG. 4B.
Figure 5:
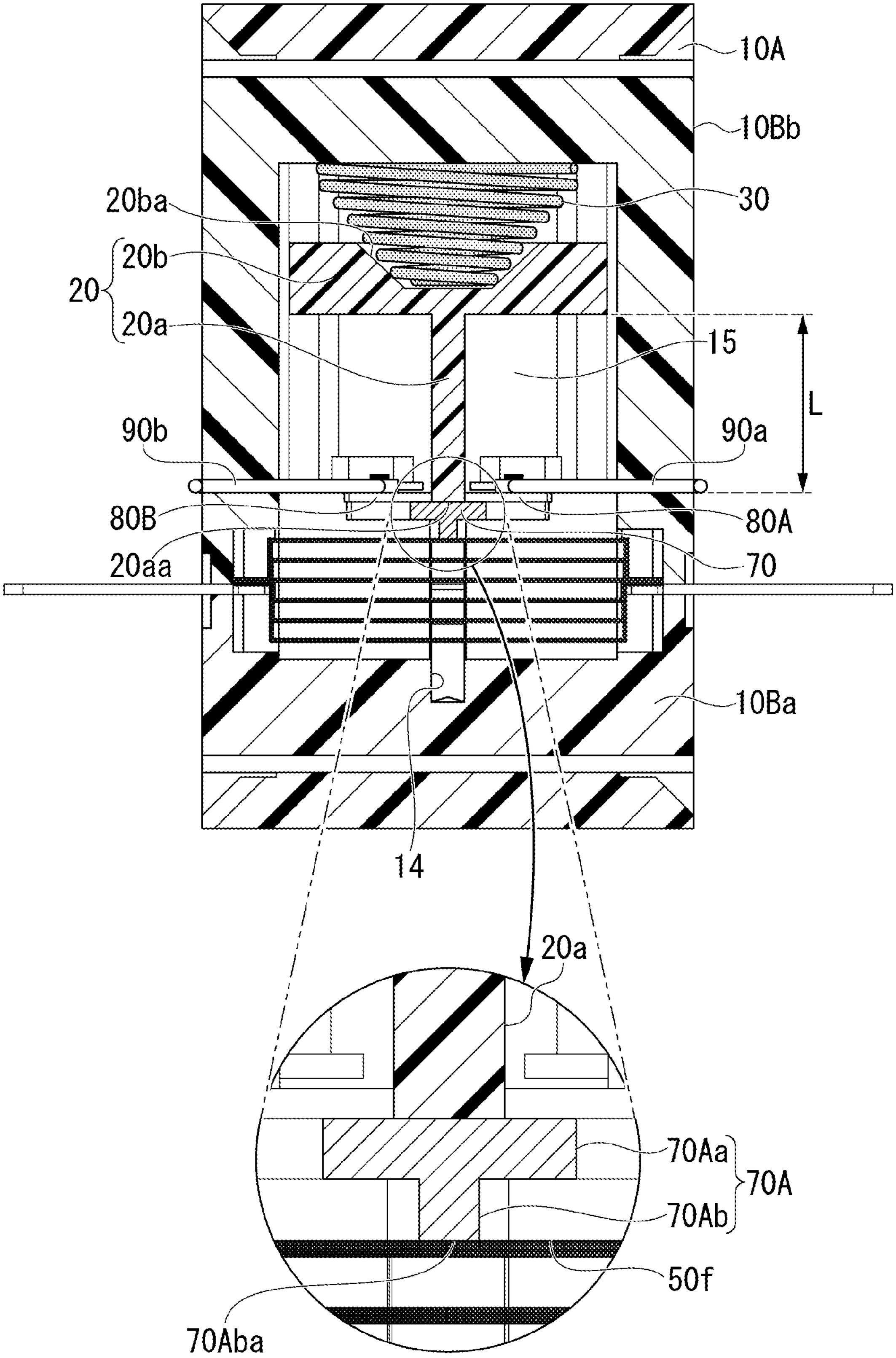
FIG. 5 is a cross-sectional view taken along line V-V' in FIG. 1 and shows a vicinity of a locking member as an enlarged view.

FIG. 1 is a perspective view schematically showing a protective element according to a first embodiment of the present invention. FIG. 2 is a perspective view schematically showing a state in which a part is removed so that the inside of the protective element shown in FIG. 1 can be seen. FIG. 3 is an exploded perspective view schematically showing the protective element shown in FIG. 1. FIG. 4A is a plan view schematically showing a first terminal, a second terminal, and one fusible conductor sheet forming a fuse element laminate. FIG. 4B is a plan view schematically showing the fuse element laminate, a second insulating member, the first terminal, and the second terminal. FIG. 4C is a cross-sectional view taken along line X-X' of the plan view shown in FIG. 4B. FIG. 5 is a cross-sectional view taken along line V-V' in FIG. 1, and shows a vicinity of a locking member as an enlarged view.

The protective element 100 shown in FIGS. 1 to 5 includes an insulating case 10, a fuse element laminate 40, a first insulating member 60A, a second insulating member 60B, a shielding member 20, a pressing unit 30, a locking member 70, a heat generating body 80, power supply members 90*a* and 90*b*, a first terminal 91, and a second terminal 92. The first insulating member 60A and the second insulating member 60B may simply be referred to as insulating members 60A and 60B.

In the protective element 100 of this embodiment, the energizing direction means a direction (the X direction) in which electricity flows during use, that is, corresponds to a direction in which the first terminal 91 and the second terminal 92 are connected. In the energizing direction, a direction from the first terminal 91 to the second terminal 92 is referred to as the second terminal 92 side (the −X side), and a direction from the second terminal 92 to the first terminal 91 is referred to as the first terminal 91 side (the +X side). Further, a cross-sectional area in the energizing direction means an area of a plane (a Y-Z plane) in a direction perpendicular to the energizing direction.

In the protective element 100 shown in FIGS. 1 to 5, although an example in which the first insulating member 60A and the second insulating member 60B have different configurations has been shown, the first insulating member 60A and the second insulating member 60B may have the same configuration.

The protective element 100 of this embodiment has an overcurrent cutoff and an active cutoff as mechanisms for cutting off a current path. In the overcurrent cutoff, when an overcurrent exceeding a rated current flows through the fusible conductor sheet 50 (refer to FIG. 4C), the fusible conductor sheet 50 is fused and the current path is cutoff. In the active cutoff, when an abnormality other than overcurrent occurs, a current is applied to the heat generating body 80 to melt the locking member 70 that restrains movement of the shielding member 20, and the shielding member 20 to which a pressing force is applied downward by the pressing unit 30 is moved to cut the fuse element 50 and to cut off the current path.

(Insulating Case)

The insulating case 10 has an approximately long cylindrical shape (a cross section of the Y-Z plane is an ellipse at any position in the X direction). The insulating case 10 is configured of a cover 10A and a holding member 10B.

The cover 10A has a long cylindrical shape with both ends open. An inner edge portion of an opening portion of the cover 10A is a chamfered inclined surface 21. A center portion of the cover 10A is an accommodation portion 22 in which the holding member 10B is accommodated.

The holding member 10B includes a first holding member 10Ba disposed on the lower side in the Z direction and a second holding member 10Bb disposed on the upper side in the Z direction.

As shown in FIG. 3, terminal mounting surfaces 111 are provided at both end portions (a first end portion 10Baa and a second end portion 10Bab) of the first holding member 10Ba in the energizing direction (the X direction).

Further, as shown in FIG. 3, power supply member mounting surfaces 12 are provided at both end portions (the first end portion 10Baa and the second end portion 10Bab) of the first holding member 10Ba. A position (a height) of the power supply member mounting surface 12 in the Z direction is approximately the same as a position (a height) of the heat generating body 80, thereby reducing a routing distance of the power supply member 90.

An internal pressure buffer space 15 (refer to FIGS. 5 and 6) is formed inside the holding member 10B. The internal pressure buffer space 15 has a function of curbing a sudden increase in an internal pressure of the protective element 100 due to a gas generated by arc discharge that occurs when the fuse element laminate 40 is fused.

The cover 10A and the holding member 10B are preferably formed of a material having a tracking resistance index CTI (resistance to tracking (carbonized conductive path) destruction) of 500 V or more.

The tracking resistance index CTI can be obtained by a test based on IEC 60112.

A resin material can be used as the material for the cover 10A and the holding member 10B.

The resin material has a smaller heat capacity and lower melting point than a ceramic material. Therefore, when a resin material is used as the material for the holding member 10B, it is preferable because it has a property of weakening arc discharge caused by gasification cooling (ablation), and because a surface of the holding member 10B is deformed or deposits are aggregated when melted and scattered metal particles adhere to the holding member 10B, and the metal particles are caused to become sparse and it is difficult to form conductive paths.

As the resin material, for example, a polyamide-based resin or fluoro-based resin can be used. The polyamide resin may be an aliphatic polyamide or a semi-aromatic polyamide. Examples of the aliphatic polyamide include nylon 4, nylon 6, nylon 46, and nylon 66. Examples of the semi-aromatic polyamide include nylon 6T, nylon 9T, and a polyphthalamide (PPA) resin. Examples of the fluoro-based resin include polytetrafluoroethylene. Furthermore, the polyamide-based resin and the fluoro-based resin have high heat resistance and are difficult to burn. In particular, aliphatic polyamide is difficult to generate graphite even when burned. Therefore, when the cover 10A and the holding member 10B are formed using aliphatic polyamide, it is possible to more reliably prevent a new current path from being formed by graphite generated by arc discharge when the fuse element laminate 40 is fused.

(Fuse Element Laminate)

The fuse element laminate includes a plurality of fusible conductor sheets disposed in parallel in a thickness direction, and a plurality of first insulating members disposed between the plurality of fusible conductor sheets and close to or in contact with the outside of the fusible conductor sheet disposed at the lowest portion among the plurality of fusible conductor sheets and in which a first opening portion or a first separation portion is formed. The plurality of fusible conductor sheets may be collectively referred to as a fuse element. The fuse element laminate is configured of the fuse element and the first insulating member.

The fuse element laminate 40 has six fusible conductor sheets 50*a*, 50*b*, 50*c*, 50*d*, 50*e*, and 50*f* disposed in parallel in the thickness direction (the Z direction). Each of first insulating members 60Ab, 60Ac, 60Ad, 60Ae, and 60Af is disposed between the fusible conductor sheets 50*a* to 50*f*. The first insulating members 60Aa to 60Af are disposed close to or in contact with the fusible conductor sheets 50*a* to 50*f*, respectively. The state in which the first insulating members 60Ab to 60Af and the fusible conductor sheets 50*a* to 50*f* are brought close to each other is preferably such that distances therebetween is 0.5 mm or less, more preferably 0.2 mm or less.

Furthermore, the first insulating member 60Aa is disposed outside the fusible conductor sheet 50*a* which is disposed at the lowest portion among the fusible conductor sheets 50*a* to 50*f*. Further, the second insulating member 60B is disposed outside the fusible conductor sheet 50*f* which is disposed at the uppermost portion among the fusible conductor sheets 50*a* to 50*f*. A width (a length in the Y direction) of each of the fusible conductor sheets 50*a* to 50*f* is narrower than a width of each of the first insulating members 60Aa to 60Af and the second insulating member 60B.

Although the fuse element laminate 40 includes six fusible conductor sheets in an example, the number is not limited to six, and any number may be used.

Each of the fusible conductor sheets 50*a* to 50*f* has a first end portion 51 and a second end portion 52 that face each other, and a fusing portion 53 located between the first end portion 51 and the second end portion 52. The first end portions 51 of the three lower fusible conductor sheets 50*a* to 50*c* of the fusible conductor sheets 50*a* to 50*f* disposed in parallel in the thickness direction are connected to a lower surface of the first terminal 91, and the first end portions 51 of the top three fusible conductor sheets 50*d* to 50*f* are connected to an upper surface of the first terminal 91. Further, the second end portions 52 of the three lower three soluble conductive sheets 50*a* to 50*c* among the soluble conductive sheets 50*a* to 50*f* are connected to a lower surface of the second terminal 92, and the second end portions 52 of the three upper soluble conductor sheets 50*d* to 50*f* are connected to an upper surface of the second terminal 92. Connection positions of the fusible conductor sheets 50*a* to 50*f* and the first terminal 91 and the second terminal 92 are not limited thereto. For example, all of the first end portions 51 of the fusible conductor sheets 50*a* to 50*f* may be connected to the upper surface of the first terminal 91, or may be connected to the lower surface of the first terminal 91. Further, all of the second end portions 52 of the fusible conductor sheets 50*a* to 50*f* may be connected to the upper surface of the second terminal 92, or may be connected to the lower surface of the second terminal 92.

Each of the fusible conductor sheets 50*a* to 50*f* may be a laminate including a low melting point metal layer and a high melting point metal layer, or may be a single layer body. The laminate including a low melting point metal layer and a high melting point metal layer may have a structure in which the periphery of the low melting point metal layer is covered with the high melting point metal layer.

The low melting point metal layer of the laminate contains Sn. The low melting point metal layer may be formed of Sn alone or may be formed of a Sn alloy. The Sn alloy is an alloy of which a main component is Sn. The Sn alloy is an alloy with the highest content of Sn among metals contained in the alloy. Examples of the Sn alloys include a Sn—Bi alloy, a In—Sn alloy, and a Sn—Ag—Cu alloy. The high melting point metal layer contains Ag or Cu. The high melting point metal layer may be formed of Ag alone, Cu alone, an Ag alloy, or a Cu alloy. The Ag alloy is an alloy with the highest content of Ag among metals contained in the alloy, and the Cu alloy is an alloy with the highest content of Cu among metals contained in the alloy. The laminate may have a two-layer structure of a low melting point metal layer and a high melting point metal layer, and may have a multilayer structure having three or more layers in which two or more high melting point metal layers and one or more low melting point metal layers are provided and the low melting point metal layers are disposed between the high melting point metal layers.

In the case of a single layer body, it contains Ag or Cu. The single layer body may be formed of Ag alone, Cu alone, an Ag alloy, or a Cu alloy.

Each of the fusible conductor sheets 50*a* to 50*f* may have a through hole 54 (54*a*, 54*b*, 54*c*) in the fusing portion 53. In the example shown in the drawing, there are three through holes, but the number is not limited. Due to the through hole 54, a cross-sectional area of the fusing portion 53 becomes smaller than a cross-sectional area of each of the first end portion 51 and the second end portion 52. As the cross-sectional area of the fusing portion 53 becomes smaller, when a large current exceeding the rating flows through each of the fusible conductor sheets 50*a* to 50*f*, an amount of heat generated in the fusing portion 53 increases, and thus the fusing portion 53 becomes a fusing portion and becomes easily fused. The structure for making the fusing portion 53 more easily fused than the first end portion 51 and second end portion 52 sides is not limited to the through hole, but may also be a structure such as narrowing a width or partially reducing a thickness. A notch shape like a perforation may also be used.

Furthermore, in each of the fusible conductor sheets 50*a* to 50*f*, the fusing portion 53 which is configured to be easily fused is easily cut by a convex portion 20*a* of the shielding member 20.

A thickness of the fusible conductor sheets 50*a* to 50*f* is formed such that they can be fused by overcurrent and can be physically cut by the shielding member 20. The specific thickness depends on the material and number of the fusible conductor sheets 50*a* to 50*f*, as well as the pressing force (stress) of the pressing unit 30, but can be set in a range of 0.01 mm or more and 0.1 mm or less, for example, when the fusible conductor sheets 50*a* to 50*f* are formed of copper foil. Further, when the fusible conductor sheets 50*a* to 50*f* are foils made by plating the periphery of an alloy containing Sn as a main component with Ag, the thickness can be set in a range of 0.1 mm or more and 1.0 mm or less as a reference.

Each of the first insulating members 60Aa to 60Af is configured of a first insulating piece 63*a* and a second insulating piece 63*b* that face each other with a gap (a first separation portion) 64 therebetween. Similarly, the second insulating member 60B is configured of a third insulating piece 66*a* and a fourth insulating piece 66*b* that face each other with a gap (second separation portion) 65 therebetween. In the shown example, the gaps 64 and 65 in the first insulating members 60Aa to 60Af and the second insulating member 60B are separation portions (the first separation portion, the second separation portion) that separate two members, but may be opening portions (a first opening portion, a second opening portion) through which the convex portion 20*a* of the shielding member 20 can move (pass). The two members are the first insulating piece 63*a* and the second insulating piece 63*b*, or the third insulating piece 66*a* and the fourth insulating piece 66*b*. The first separation portion 64 and the second separation portion 65 may simply be referred to as separation portions 64 and 65. Further, the first opening portion and the second opening portion may be simply referred to as opening portions (refer to a first opening portion 64A and a second opening portion 65A in a modified example described below).

Each of the first insulating piece 63*a* and the second insulating piece 63*b* has ventilation holes 67 at both end sides in the Y direction to efficiently release a pressure increase caused by arc discharge that occurs when the fuse element is cut off into a pressing unit accommodation space of the insulating case. In the shown example, each of the first insulating piece 63*a* and the second insulating piece 63*b* has three ventilation holes 67 on both end sides in the Y direction, but the number is not limited.

The increased pressure generated by arc discharge passes through the ventilation hole 67 and is efficiently released into the space that accommodates the pressing unit 30 of the insulating case 10 through gaps (not shown) at four corners provided between a pressing unit support portion 20*b* and a second holding member 10Bb. As a result, a shielding operation of the shielding member 20 is performed smoothly, and destruction of the first insulating members 60Aa to 60Af and the second insulating member 60B is prevented.

The gaps 64 and 65 are located at a position opposite the fusing portions 53 disposed between the first end portions 51 and the second end portions 52 of the fusible conductor sheets 50*a* to 50*f*. That is, the first insulating members 60Aa to 60Af and the second insulating member 60B are separated at positions facing the fusing portions 53 of the fusible conductor sheets 50*a* to 50*f*.

The first insulating members 60Aa to 60Af and the second insulating member 60B are preferably formed of a material having a tracking resistance index CTI of 500V or more.

A resin material can be used as the material for the first insulating members 60Aa to 60Af and the second insulating member 60B. Examples of the resin material are the same as those for the cover 10A and the holding member 10B.

The fuse element laminate 40 can be manufactured, for example, as follows.

The fusible conductor sheets 50*a* to 50*f* and the first insulating members 60Ab to 60Af are alternately stacked in the thickness direction on the first insulating member 60Aa using a jig having positioning concave portions corresponding to the convex portions provided on the first insulating members 60Aa to 60Af and the second insulating member 60B and positioning fixing portions for the first terminal 91 and the second terminal 92, and the second insulating member 60B is disposed on the upper surface of the fusible conductor sheet 50*f* disposed at the top to obtain a laminate.

(Shielding Member)

The shielding member 20 has the convex portion 20*a* that faces the fuse element laminate 40 side, and the pressing unit support portion 20*b* having a concave portion 20*ba* that accommodates and supports a lower portion of the pressing unit 30. Downward movement of the shielding member 20 by the locking member 70 is restrained in a state in which the pressing force of the pressing unit 30 is applied downward thereto. Therefore, when the locking member 70 is heated by heat generated by the heat generating body 80 and softened at a temperature equal to or higher than a softening temperature, the shielding member 20 becomes movable downward. At this time, the softened locking member 70 is physically cut by the shielding member 20 or thermally fused by the shielding member 20 according to the type of material, heating conditions, and the like, or is subjected to a combined action of the physical cutting and the thermal fusing by the shielding member 20.

When the downward movement of the shielding member 20 by the locking member 70 is no longer restrained, it moves downward and physically cuts the fusible conductor sheets 50*a* to 50*f*.

In the shielding member 20, a tip end 20*aa* of the convex portion 20*a* is sharp and has a shape that makes it easy to cut the fusible conductor sheets 50*a* to 50*f*.

Figure 6:
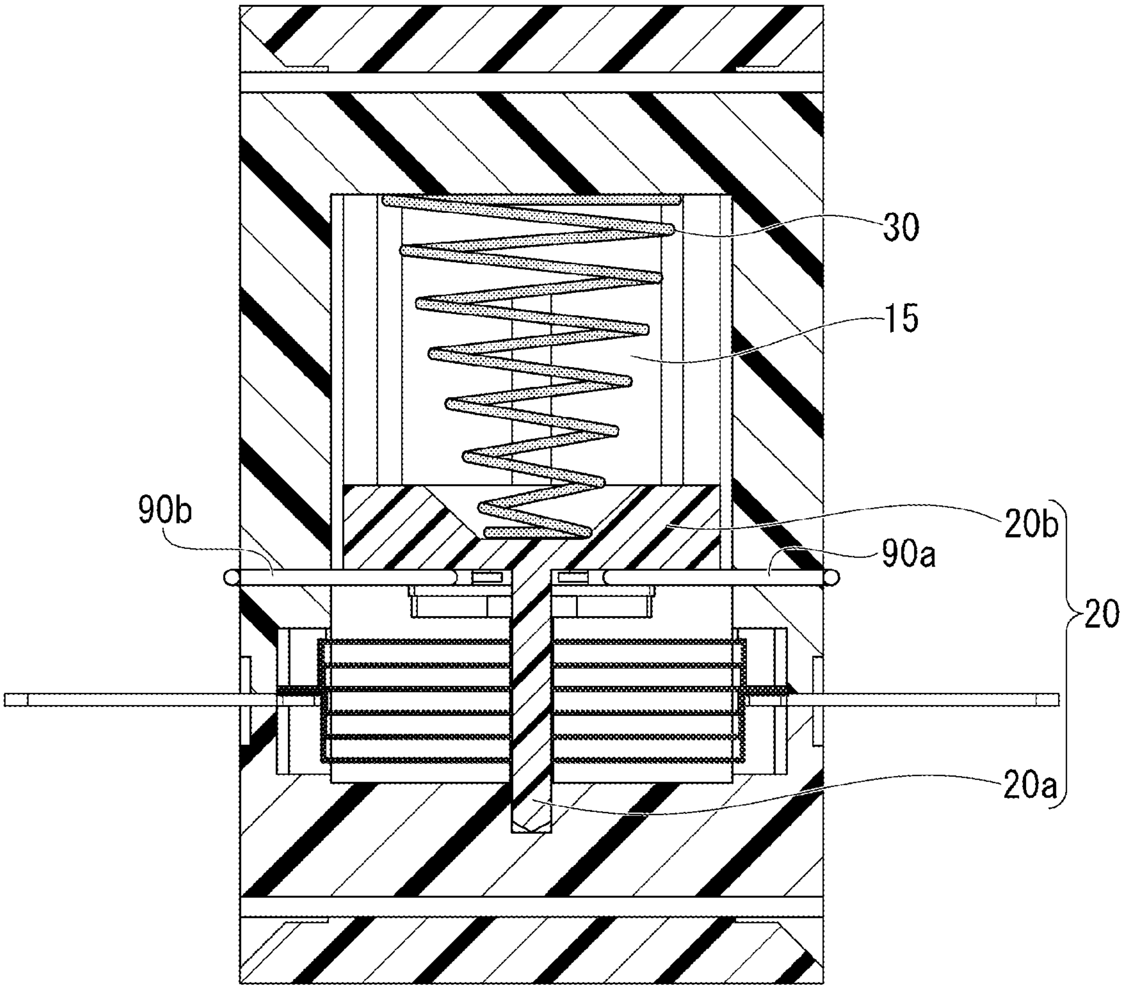
FIG. 6 is a cross-sectional view of the protective element in a state in which a shielding member has cut the fuse element and is completely lowered.

FIG. 6 shows a cross-sectional view of the protective element in a state in which the shielding member 20 moves through the gaps 64 and 65 in the fuse element laminate 40 and cuts the fusible conductor sheets 50*a*, 50*b*, 50*c*, 50*d*, 50*e*, and 50*f* by the convex portion 20*a*, and the shielding member 20 is completely lowered.

The shielding member 20 moves downward through the gaps 65 and 64 of the fuse element laminate 40, and the convex portion 20*a* of the shielding member 20 sequentially cuts the fusible conductor sheets 50*f*, 50*e*, 50*d*, 50*c*, 50*b*, and 50*a*. Then, cut surfaces are shielded and insulated from each other by the convex portions 20*a*, and an energizing path through each of the fusible conductor sheets is physically and reliably cut off. Thus, arc discharge is quickly extinguished (disappears).

In addition, in the state in which the shielding member 20 moves through the gaps 65 and 64 of the fuse element laminate 40 and is completely lowered, the pressing unit support portion 20*b* of the shielding member 20 presses the fuse element laminate 40 from the second insulating member 60B, and the fusible conductor sheet, the first insulating members 60Aa to 60Af, and the second insulating member 60B are brought into close contact with each other. Therefore, there is no space in which arc discharge can continue, and arc discharge is surely extinguished.

A thickness (a length in the X direction) of the convex portion 20*a* is smaller than a width in the X direction of the gaps 64 and 65 between the first insulating members 60Aa to 60Af and the second insulating member 60B. With such a configuration, the convex portion 20*a* can move downward in the Z direction through the gaps 64 and 65.

For example, when the fusible conductor sheets 50*a* to 50*f* are formed of a copper foil, a difference between the thickness of the convex portion 20*a* and the width of the gaps 64 and 65 in the X direction may be, for example, 0.05 to 1.0 mm, and preferably 0.2 to 0.4 mm. When the difference is 0.05 mm or more, even if cut end portions of the fusible conductor sheets 50*a* to 50*f* with a minimum thickness of 0.01 mm enter the gaps between the first insulating members 60Aa to 60Af and the second insulating member 60B and the convex portion 20*a*, the convex portion 20*a* can move smoothly, and arc discharges are extinguished more quickly and reliably. This is because when the difference is 0.05 mm or more, the convex portion 20*a* is less likely to be caught. Further, when the difference is 1.0 mm or less, the gaps 64 and 65 function as a guide for moving the convex portion 20*a*. Therefore, position shift of the convex portion 20*a* that moves when the fusible conductor sheets 50*a* to 50*f* are fused is prevented, and arc discharge is extinguished more quickly and reliably. When the fusible conductor sheets 50*a* to 50*f* are formed of a foil formed by plating the periphery of an alloy containing Sn as a main component with Ag, the difference between the thickness of the convex portion 20*a* and the width of the gaps 64 and 65 in the X direction may be, for example, 0.2 to 2.5 mm, and preferably 0.22 to 2.2 mm.

A width (a length in the Y direction) of the convex portion 20*a* is wider than a width of the fusible conductor sheets 50*a* to 50*f* of the fuse element laminate 40. With such a configuration, the convex portion 20*a* can cut each of the fusible conductor sheets 50*a* to 50*f*.

A length L of the convex portion 20*a* in the Z direction has a length that allows the tip end 20*aa* of the convex portion 20*a* to reach below the first insulating member 60Aa disposed at the lowest portion in the Z direction among the first insulating members 60Aa to 60Af, when the convex portion 20*a* is completely lowered in the Z direction. When the convex portion 20*a* is lowered below the first insulating member 60Aa disposed at the lowest portion, the convex portion 20*a* is inserted into an insertion hole 14 formed in an inner bottom surface 13 of the holding member 10Ba.

With such a configuration, the convex portion 20*a* can cut each of the fusible conductor sheets 50*a* to 50*f*.

(Pressing Unit)

The pressing unit 30 is accommodated in the concave portion 20*ba* of the shielding member 20 in a state in which the shielding member 20 is pressed downward in the Z direction.

As the pressing unit 30, for example, a known means capable of imparting an elastic force, such as a spring or rubber, can be used.

In the protective element 100, a spring is used as the pressing unit 30. The spring (the pressing unit) 30 is held in a compressed state in the concave portion 20*ba* of the shielding member 20.

As a material of the spring used as the pressing unit 30, known materials can be used.

As the spring used as the pressing unit 30, a cylindrical spring or a conical spring may be used. When the conical spring is used, a contraction length can be shortened, and thus a height when pressed can be reduced, and a size of the protective element can be reduced. Moreover, it is also possible to increase stress by stacking a plurality of conical springs.

When the conical spring is used as the pressing unit 30, the side with a smaller outer diameter may be disposed toward the fusing portion (a cutting portion) 53 of each of the fusible conductor sheets 50*a* to 50*f*, and the side with a larger outer diameter may be disposed toward the fusing portion 53 of each of the fusible conductor sheets 50*a* to 50*f*.

When the conical spring is used as the pressing unit 30, it is disposed so that the side with the smaller outer diameter faces the fusing portion (the cutting portion) 53 of each of the fusible conductor sheets 50*a* to 50*f*. Thus, for example, when the spring is formed of a conductive material such as a metal, the continuation of arc discharge that occurs when the fusing portion 53 of each of the fusible conductor sheets 50*a* to 50*f* is cut can be more effectively curbed. This is because a distance between a location at which arc discharge occurs and the conductive material forming the spring can be easily ensured.

Further, when the conical spring is used as the pressing unit 30 and the side with the larger outer diameter is disposed toward the fusing portion 53 of each of the fusible conductor sheets 50*a* to 50*f*, this is preferable because an elastic force can be uniformly applied to the shielding member 20 from the pressing unit 30.

(Locking Member)

The locking member 70 bridges the gap 65 in the second insulating member 60B and restrains movement of the shielding member 20.

Although the protective element 100 includes three locking members 70 (70A, 70B, and 70C), the number is not limited to three.

The locking member 70A is placed (inserted) in a groove 60Ba1 and a groove 60Ba2 of the second insulating member 60B, the locking member 70B is placed (inserted) in a groove 60Bb1 and a groove 60Bb2 of the second insulating member 60B, and the locking member 70C is placed (inserted) in a groove 60Bc1 and a groove 60Bc2 of the second insulating member 60B.

Further, the tip end 20*aa* of the convex portion 20*a* of the shielding member 20 has a groove corresponding to a shape and position of the locking member 70 (refer to FIG. 12B), and the groove holds the locking member 70 stably so as to sandwich it therein.

The three locking members 70A, 70B, and 70C have the same shape. When the shape of the locking member 70A will be described with reference to the drawings, the locking member 70A has a support portion 70Aa placed and supported in the groove formed in the second insulating member 60B, and a protruding portion 70Ab that extends downward from the support portion and having a tip end 70Aba close to or in contact with the fusible conductor sheet 50*f* disposed at the uppermost portion. All of the locking members 70 have the same shape, but may have different shapes.

Heat generating bodies 80A and 80B are placed on the locking members 70A, 70B, and 70C. When a current is applied to the heat generating bodies 80A and 80B, the heat generating bodies 80A and 80B generate heat which is transferred to the locking member 70, and thus the locking member 70 is caused to rise in temperature and to be softened at a temperature equal to or higher than a softening temperature thereof. Here, the softening temperature means a temperature or temperature range at which a solid phase and a liquid phase is mixed or coexist. When the locking member 70 reaches a temperature equal to or higher than the softening temperature, it becomes soft enough to be deformed by an external force.

The softened locking member 70 is easily physically cut by the convex portion 20*a* of the shielding member 20 pressed by the pressing force of the pressing unit 30. When the locking member 70 is cut, the convex portion 20*a* of the shielding member 20 is inserted downward in the Z direction through the gaps 65 and 64.

When the convex portion 20*a* is inserted downward in the Z direction through the gaps 65 and 64, the convex portion 20*a* cuts the fusible conductor sheet and advances to reach the lowest position. Thus, the convex portion 20*a* shields the fusible conductor sheets 50*a* to 50*f* into the first terminal 91 side and the second terminal 92 side with the fusing portion 53. Thus, arc discharge generated when the fusible conductor sheets 50*a* to 50*f* are cut can be extinguished quickly and reliably.

The heat generated by the heat generating bodies 80A and 80B heats the fusible conductor sheet 50*f* via the locking member 70, and further heats other fusible conductor sheets, and thus the fusible conductor sheets 50*a* to 50*f* are likely to be physically cut. Furthermore, according to a magnitude of heat generated by the heat generating bodies 80A and 80B, the fusible conductor sheet 50*f* may be thermally fused. In this case, the convex portion 20*a* advances as it is and reaches the lowest position.

In the locking member 70, the protruding portion 70Ab is in contact with the fusible conductor sheet 50*f*. Therefore, when an overcurrent exceeding a rated current flows through the fusible conductor sheet, heat is transferred to the locking member 70 in contact with the fusible conductor sheet 50*f*, a temperature thereof is increased, and the locking member 70 becomes softened at a temperature equal to or higher than the softening temperature.

Further, when a large overcurrent flows and the fusible conductor sheet 50*f* is instantaneously fused, generated arc discharge also flows to the locking member 70, and the locking member 70 is softened at a temperature equal to or higher than the softening temperature.

The softened locking member 70 is easily physically cut by the convex portion 20*a* of the shielding member 20 pressed by the pressing force of the pressing unit 30. When the locking member 70 is cut, the convex portion 20*a* of the shielding member 20 is inserted downward in the Z direction through the gaps 65 and 64.

In this case, the fusible conductor sheet is thermally fused due to the flow of an overcurrent exceeding the rated current, and the convex portions 20*a* are inserted downward in the Z direction through the gaps 65 and 64 as it is. At this time, the convex portion 20*a* shields the fusible conductor sheets 50*a* to 50*f* into the first terminal 91 side and the second terminal 92 side with the fusing portion. Thus, arc discharge generated when the fusible conductor sheets 50*a* to 50*f* are cut can be extinguished quickly and reliably.

Even if the fusible conductor sheet is not yet thermally fused, when the convex portion 20*a* is inserted downward in the Z direction through the gaps 65 and 64, the convex portion 20*a* cuts the fusible conductor sheet and advances to reach the lowest position. Thus, the convex portion 20*a* shields the fusible conductor sheets 50*a* to 50*f* into the first terminal 91 side and the second terminal 92 side with the fusing portion. Thus, arc discharge that occurs when the fusible conductor sheets 50*a* to 50*f* are cut off can be extinguished quickly and reliably.

Figure 7:
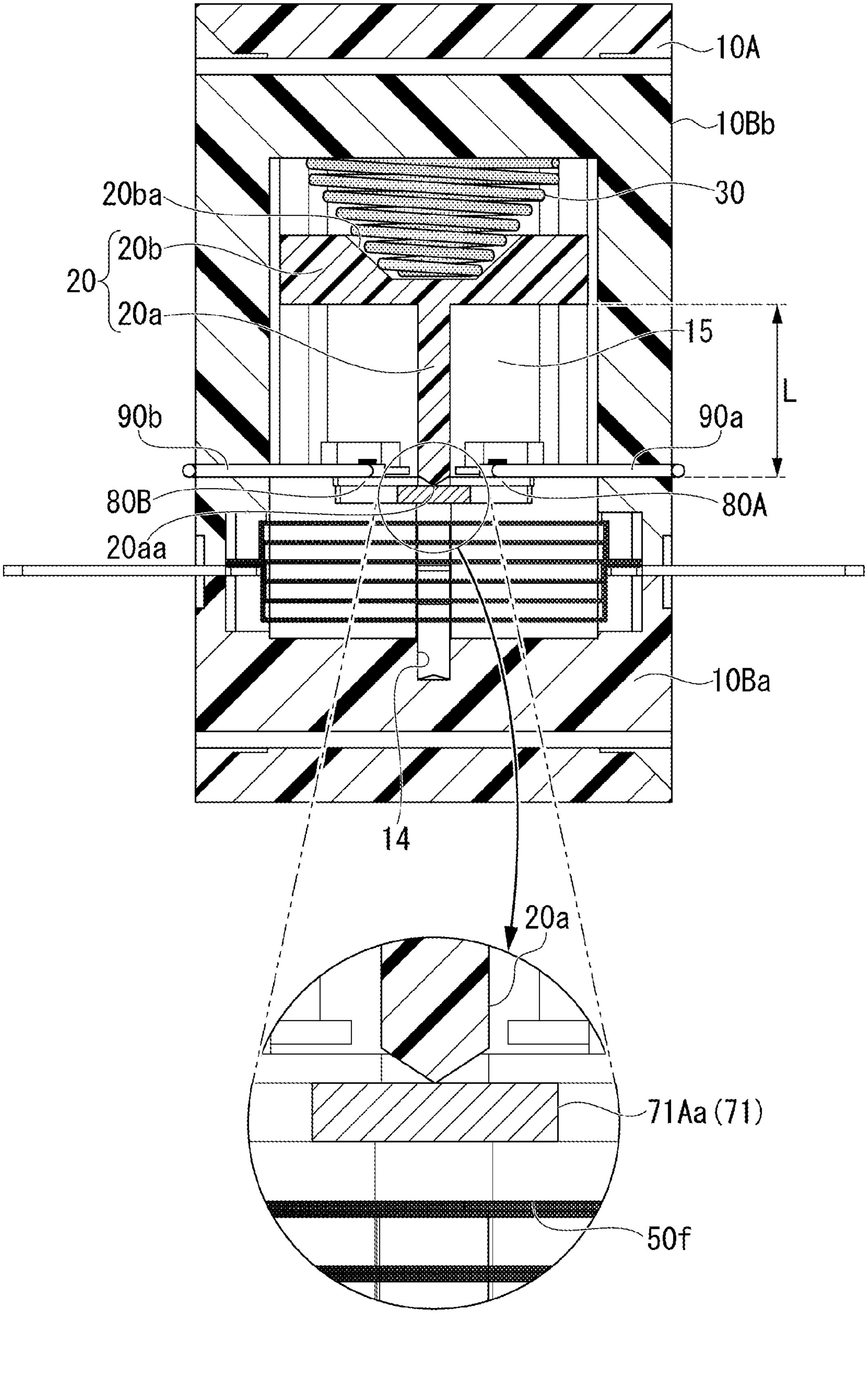
FIG. 7 is a cross-sectional view of a protective element having a modified example of the locking member and shows a vicinity of the locking member as an enlarged view.

FIG. 7 shows a protective element having a locking member 71 which is a modified example of the locking member 70. FIG. 7 also shows an enlarged view of a vicinity of the locking member 71.

The locking member 71 has only a support portion 71Aa that is placed and supported in a groove formed in the second insulating member 60B, and does not have a protruding portion in contact with the fusible conductor sheet 50*f*.

Since the locking member 71 does not have a portion in contact with the fusible conductor sheet 50*f*, even if an overcurrent exceeding the rated current flows through the fusible conductor sheet, it will not be softened and will only be softened by the heat generating body 80. However, when arc discharge occurs due to high voltage, arc discharge reaches the locking member 71 and fuses the locking member 71, thereby shielding the fusible conductor sheets 50*a* to 50*f* by the convex portion 20*a* to the first terminal 91 side and the second terminal 92 side with the fusing portion.

A material of the locking members 70 and 71 can be the same as that of the fusible conductor sheet, but it is preferably a laminate including a low melting point metal layer and a high melting point metal layer because it is quickly softened when the heat generating body 80 is energized. For example, it is possible to use an alloy of which a main component is Sn having a melting point of 217° C. and the periphery is plated with Ag having a melting point of 962° C.

(Heat Generating Body)

The heat generating body 80 is placed so as to be in contact with an upper surface of the locking member 70. When the heat generating body 80 is energized, it generates heat, and the locking member 70 is heated, softened, and melted by the heat.

By melting the locking member 70, the shielding member 20 to which a pressing force is applied downward in the Z direction by the pressing unit 30 is inserted into a gap in the fuse element laminate 40, cuts the fusible conductor sheet 50 and shields the fuse element laminate 40 into the first terminal 91 side and the second terminal 92 side.

Although the protective element 100 includes two heat generating bodies 80 (80A and 80B), the number is not limited to two.

Figure 8A:
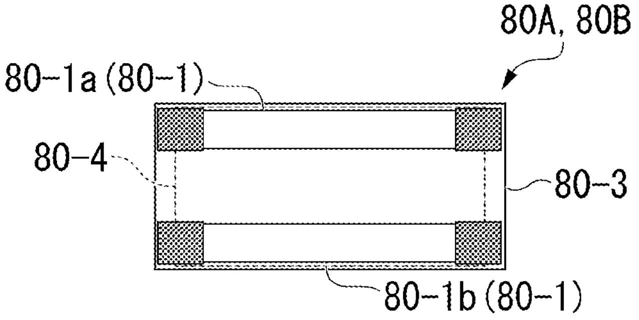
FIG. 8A shows an example of a structure of a heat generating body, and shows a top plan view.
Figure 8B:
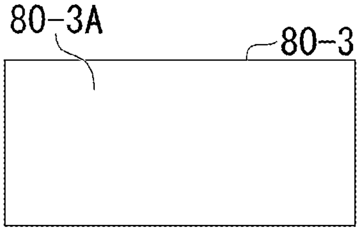
FIG. 8B shows an example of the structure of the heat generating body, and shows a top plan view of an insulating substrate before printing.
Figure 8C:
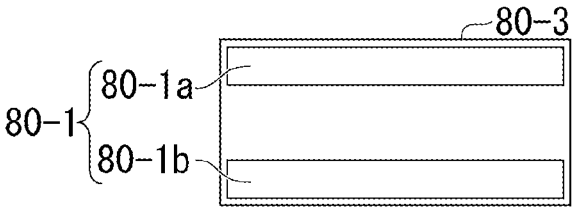
FIG. 8C shows an example of the structure of the heat generating body, and shows a top plan view after a resistive layer is printed.
Figure 8D:
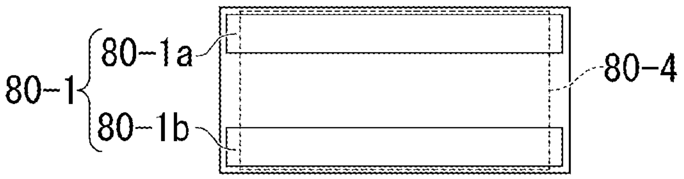
FIG. 8D shows an example of the structure of the heat generating body, and shows a top plan view after an insulating layer is printed.
Figure 8E:
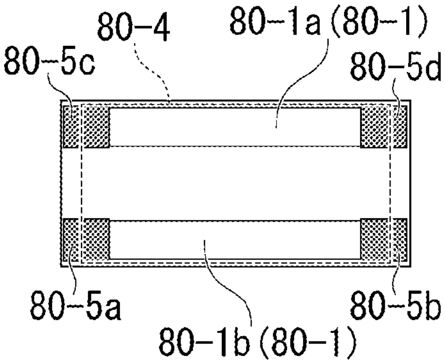
FIG. 8E shows an example of the structure of the heat generating body, and shows a top plan view after an electrode layer is printed.
Figure 8F:
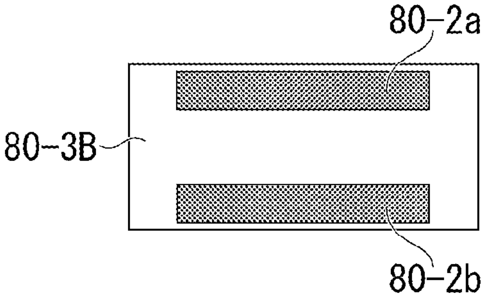
FIG. 8F shows an example of the structure of the heat generating body, and shows a bottom plan view.

FIGS. 8A to 8F show schematic views of the heat generating body 80. FIG. 8A is a plan view of a front surface (a surface on the pressing unit 30 side) of the heat generating body 80. FIG. 8B is a plan view of the insulating substrate. FIGS. 8C to 8E are transparent plan views showing three layers on the front surface side of the insulating substrate stacked one after another so that lower layers can also be seen. FIG. 8C is a plan view of a state in which a resistance layer is stacked on the insulating substrate. FIG. 8D is a plan view of a state in which an insulating layer is further stacked on the structure shown in FIG. 8C. FIG. 8E is a plan view of a state in which an electrode layer is further stacked on the structure shown in FIG. 8D. FIG. 8F is a plan view of a back surface (a surface on the fuse element laminate 40 side) of the heat generating body 80.

Each of the heat generating bodies 80A and 80B includes two resistance layers 80-1 (80-1*a* and 80-1*b*) disposed parallel to and apart from a front surface 80-3A (a surface on the pressing unit 30 side) of an insulating substrate 80-3, an insulating layer 80-4 that covers the resistance layer 80-1, a heat generating body electrode 80-5*a* and a heat generating body electrode 80-5*b* formed on the insulating substrate 80-3 and electrically connected to both ends of the resistance layer 80-1*a*, a heat generating body electrode 80-5*c* and a heat generating body electrode 80-5*d* electrically connected to both ends of the resistance layer 80-1*b*, and an electrode layer 80-2 (80-2*a* and 80-2*b*) formed on a back surface 80-3B (a surface on the fuse element laminate 40 side) of the insulating substrate 80-3. Two resistance layers are provided for each of the heat generating bodies 80A and 80B, but this is a fail-safe design that allows the heat generating bodies to be mountable even in a rotated state by 180 degrees, and two resistance layers are not essential.

The resistance layer 80-1 is formed of a conductive material that generates heat when energized, such as nichrome, W, Mo, Ru, or the like, or a material containing them. The resistance layer 80-1 is formed by mixing powder of alloys, compositions, or compounds thereof with a resin binder, or the like, patterning a paste on the insulating substrate 80-3 using a screen printing technique and baking the pattern. The insulating substrate 80-3 is an insulating substrate formed of, for example, alumina, glass ceramics, mullite, zirconia, or the like and having an insulating property. The insulating layer 80-4 is provided to protect the resistance layer 80-1. As a material of the insulating layer 80-4, for example, insulating materials such as ceramics and glass can be used. The insulating layer 80-4 can be formed by applying a paste of an insulating material and baking it.

The heat generating body electrodes 80-5*a* to 80-5*d* on the front surface of each of the heat generating bodies 80A and 80B and the electrode layers 80-2*a* to 80-2*b* on the back surface are electrically insulated by the insulating substrate 80-3.

The heat generating bodies 80A and 80B are not limited to those shown in FIGS. 8A to 8F, and any known heat generating body can be used.

The heat generating bodies 80A and 80B are energized and generate heat by a current control element provided in an external circuit when it is necessary to cut off the energization path due to an abnormality occurring in the external circuit that serves as the energization path of the protective element 100.

(Power Supply Member)

Figure 9A:
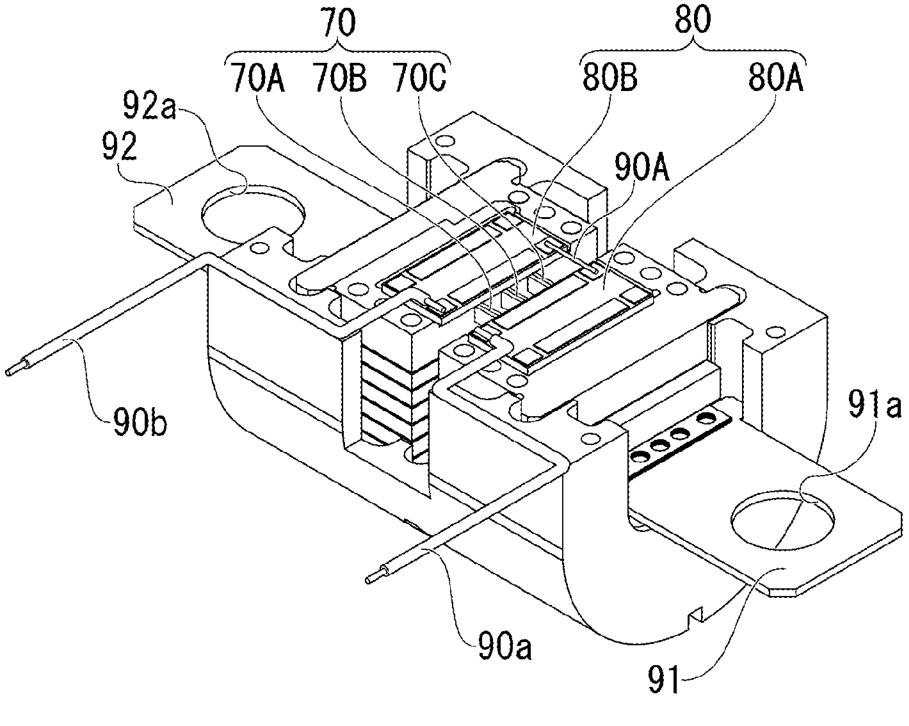
FIG. 9A is a perspective view of the protective element for describing a method for drawing out a power supply member that supplies power to the heat generating body, and shows a case in which two heat generating bodies are connected in series.
Figure 9B:
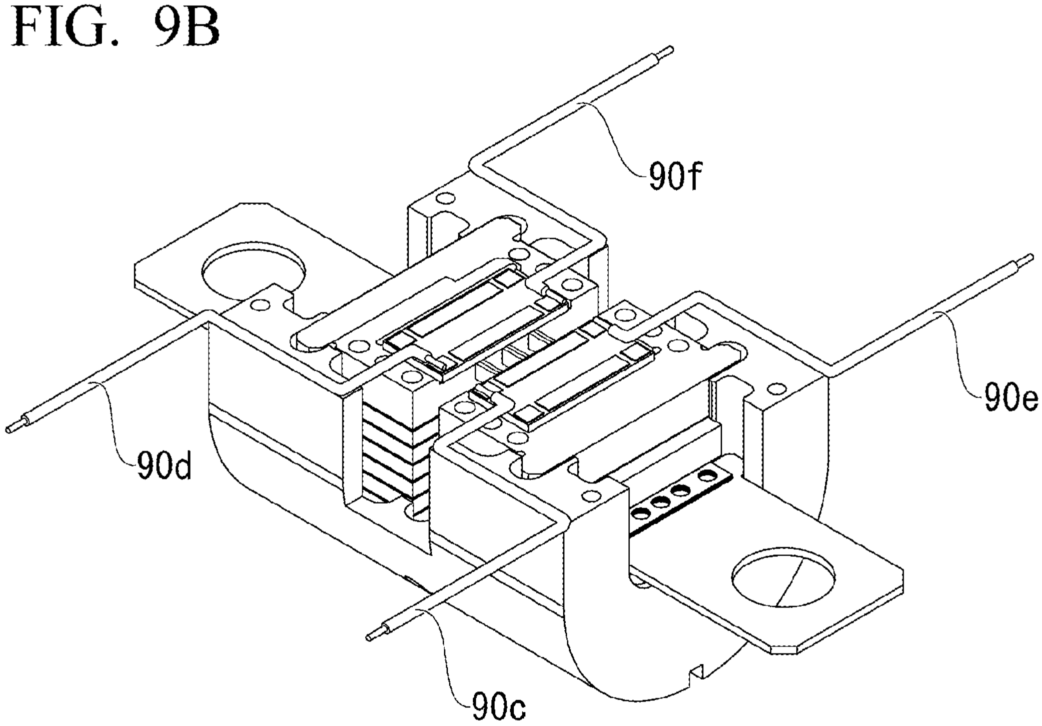
FIG. 9B is a perspective view of the protective element for describing the method for drawing out a power supply member that supplies power to the heat generating body, and shows a case in which two heat generating bodies are connected in parallel.

FIGS. 9A and 9B are perspective views of the protective element for describing a method of drawing out the power supply member that supplies power to the heat generating bodies 80A and 80B. FIG. 9A shows a case in which the heat generating bodies 80A and 80B are connected in series. FIG. 9B shows a case in which the heat generating bodies 80A and 80B are connected in parallel. In this embodiment, at least a part of the power supply member is configured of an electric wire (a wiring member). However, the present invention is not limited thereto, and although not particularly shown, at least a part of the power supply member may be formed of a conductive plate-like member, a rod-like member, or the like.

In FIG. 9A, the power supply member 90*a* is connected to the heat generating body electrode 80-5*c* (refer to FIG. 8E) of the heat generating body 80A, the power supply member 90*b* is connected to the heat generating body electrode 80-5*a* (refer to FIG. 8E) of the heat generating body 80B, and the power supply member 90A is connected to the heat generating body electrode 80-5*d* (refer to FIG. 8E) of the heat generating body 80A and the heat generating body electrode 80-5*b* (refer to FIG. 8E) of the heat generating body 80B. Furthermore, the electrode layer 80-2 of the heat generating body 80A is connected to the electrode layer 80-2 of the heat generating body 80B via the locking members 70 (70A, 70B, and 70C). In this configuration, power is supplied through a path of "the power supply member 90*a*~the heat generating body electrode 80-5*c* of the heat generating body 80A~the resistance layer 80-1*a* of the heat generating body 80A~the heat generating body electrode 80-5*d* of the heat generating body 80A~the power supply member 90A~the heat generating body electrode 80-5*b* of the heat generating body 80B~the resistance layer 80-1*b* of the heat generating body 80B~the heat generating body electrode 80-5*a* of the heat generating body 80B~the power supply member 90*b*" to cause the heat generating bodies 80A and 80B to generate heat. The locking members 70 (70A, 70B, and 70C) are melted by the heat generation, and the shielding member 20 is inserted into the gaps 64 and 65 of the fuse element laminate 40. The power supply member 90A is cut, the power supply to the heat generating bodies 80A and 80B is cut off, and the heat generation of the heat generating bodies 80A and 80B is stopped by inserting the shielding member 20 into the gaps 64 and 65 of the fuse element laminate 40.

In FIG. 9B, the power supply member 90*c* is connected to the heat generating body electrode 80-5*c* of the heat generating body 80A, and the power supply member 90*e* is connected to the heat generating body electrode 80-5*d* of the heat generating body 80A. Further, a power supply member 90*d* is connected to the heat generating body electrode 80-5*a* of the heat generating body 80B, and a power supply member 90*f* is connected to the heat generating body electrode 80-5*b* (refer to FIG. 8E). In this configuration, a first path of "the power supply member 90*c*~the heat generating body electrode 80-5*c* of the heat generating body 80A~the resistance layer 80-1*a* of the heat generating body 80A~the heat generating body electrode 80-5*d* of the heat generating body 80A~the power supply member 90*e*" and a second path of "the power supply member 90*d*~the heat generating body electrode 80-5*a* of the heat generating body 80B~the resistance layer 80-1*b* of the heat generating body 80B~the heat generating body electrode 80-5*b* of the heat generating body 80B~the power supply member 90*f*" are configured in parallel. Power is supplied through the first path and the second path to cause the heat generating bodies 80A and 80B to generate heat. The locking members 70 (70A, 70B, and 70C) are melted by this heat generation, and the shielding member 20 is inserted into the gaps 64 and 65 of the fuse element laminate 40. In this configuration, the power supply to the heat generating bodies 80A and 80B is not cut off by inserting the shielding member 20 into the gaps 64 and 65 of the fuse element laminate 40, and the heat generating bodies 80A and 80B continue to generate heat. Therefore, it is possible to stop the heat generation of the heat generating bodies 80A and 80B of the protective element 100 after the cutoff by appropriately stopping energization to a current control element using separate system control (such as a timer).

(First Terminal, Second Terminal)

One end portion of the first terminal 91 is connected to the first end portions 51 of the fusible conductor sheets 50*a* to 50*f*, and the other end portion is exposed to the outside of the insulating case 10. Further, one end portion of the second terminal 92 is connected to the second end portions 52 of the fusible conductor sheets 50*a* to 50*f*, and the other end portion is exposed to the outside of the insulating case 10.

The first terminal 91 and the second terminal 92 may have substantially the same shape, or may have different shapes. A thickness of each of the first terminal 91 and the second terminal 92 is not particularly limited, but may be, for example, in a range of 0.3 mm or more and 1.0 mm or less. The thickness of the first terminal 91 and the thickness of the second terminal 92 may be the same or different.

The first terminal 91 has an external terminal hole 91*a*. Further, the second terminal 92 has an external terminal hole 92*a*. One of the external terminal hole 91*a* and the external terminal hole 92*a* is used for connecting to the power source side, and the other is used for connecting to the load side. Alternatively, the external terminal hole 91*a* and the external terminal hole 92*a* may be used for connection to an energizing path inside a load. The external terminal hole 91*a* and the external terminal hole 92*a* can be formed as through holes that are substantially circular in plan view.

The first terminal 91 and the second terminal 92 may be formed of, for example, copper, brass, nickel, or the like. As a material for the first terminal 91 and the second terminal 92, it is preferable to use brass from the viewpoint of increasing rigidity, and it is preferable to use copper from the viewpoint of reducing electrical resistance. The first terminal 91 and the second terminal 92 may be formed of the same material or may be formed of different materials.

(Method for Manufacturing Protective Element)

The protective element 100 of this embodiment can be manufactured as follows.

First, the fuse element laminate 40 which is positioned using a jig, and the first terminal 91 and the second terminal 92 are prepared. Then, the first end portion 51 of each of the fusible conductor sheets 50*a* to 50*f* of the fuse element laminate 40 are connected to the first terminal 91 by soldering.

Further, the second end portion 52 and the second terminal 92 are connected by soldering. As a solder material used for soldering, any known material can be used, and from the viewpoint of resistivity, melting point, and environment-friendly lead-free properties, it is preferable to use a material containing Sn as a main component. The connection between the first end portion 51 of each of the fusible conductor sheets 50*a* to 50*f* and the first terminal 91 and the connection between the second end portion 52 of each of the fusible conductor sheets 50*a* to 50*f* and the second terminal 92 are not limited to soldering, and any known joining method such as welding may be used.

Next, the locking members 70A, 70B, and 70C are prepared. The locking members 70A, 70B, and 70C are disposed in the grooves 60Ba1 and 60Ba2, the grooves 60Bb1 and 60Bb2, and the grooves 60Bc1 and 60Bc2 of the second insulating member 60B shown in FIG. 3, respectively. Further, a jig having the same shape as the second insulating member 60B may be used.

Next, heat generating bodies 80A and 80B shown in FIGS. 8A and 8B and solder paste are prepared. Then, after an appropriate amount of solder paste is applied to connection portions of the locking members 70A, 70B, and 70C and the heat generating bodies 80A and 80B, the heat generating bodies 80A and 80B are disposed at predetermined positions on the second insulating member 60B, as shown in FIG. 9A. The back sides of the heat generating bodies 80A and 80B are placed on the locking members 70A, 70B, and 70C. The locking members 70A, 70B, and 70C and the heat generating bodies 80A and 80B are connected by soldering by heating in an oven, reflow oven, or the like.

Next, the power supply members 90*a*, 90*b*, and 90A are prepared. The power supply member 90*a* is disposed on the power supply member mounting surface 12, and the power supply member 90*a* is connected to the heat generating body electrode 80-5*c* of the heat generating body 80A by soldering. Further, the power supply member 90*b* is disposed on the power supply member mounting surface 12, and the power supply member 90*b* is connected to the heat generating body electrode 80-5*a* of the heat generating body 80B by soldering. Further, the power supply member 90A is connected to the heat generating body electrode 80-5*d* of the heat generating body 80A and the heat generating body electrode 80-5*b* of the heat generating body 80B by soldering. The power supply members 90*a*, 90*b*, and 90A and the heat generating bodies 80A and 80B may be connected by welding, and a known joining method can be used.

Next, the second holding member 10Bb, the shielding member 20, and the pressing unit 30 are prepared. Then, the pressing unit 30 is disposed in the concave portion 20*ba* of the shielding member 20 and accommodated in the second holding member 10Bb.

Next, the holding member 10B is formed by engaging four convex portions (not shown) formed at corresponding locations on the second holding member 10Bb with two concave portions 17 formed on each of the first end portion 10Baa and the second end portion 10Bab of the first holding member 10Ba while the locking members 70A, 70B, and 70C are fitted into the grooves provided at the tip end 20*aa* of the shielding member 20 and the pressing unit 30 compressed.

Next, the cover 10A is prepared. Then, the holding member 10B is inserted into the accommodation portion 22 of the cover 10A. Next, an adhesive is injected into a terminal adhesive injection port 16 of the holding member 10B to fill gaps between the terminal mounting surface 111 and the first terminal 91 and the second terminal 92. Further, an adhesive is injected into the inclined surface 21 of the elliptical side surface of the cover 10A, which is a case adhesive injection port, to bond the cover 10A and the holding member 10B. As the adhesive, for example, an adhesive containing a thermosetting resin can be used. In this way, the insulating case 10 in which the inside of the cover 10A is sealed is formed.

Through the above steps, the protective element 100 of this embodiment is obtained.

In the protective element 100 of the present embodiment, when an overcurrent exceeding the rated current flows through the fuse element 50 (the plurality of fusible conductor sheets 50*a* to 50*f*), the fuse element 50 is thermally fused and the current path is cut off. In addition to the above, it is possible to cut off the current path by melting the locking member 70 that restrains the movement of the shielding member 20 by applying a current to the heat generating body 80, and moving the shielding member 20 by the pressing unit 30 to physically cut the fuse element 50.

In the protective element 100 of this embodiment, since the movement of the shielding member 20 to which the pressing force by the pressing unit 30 is applied is restrained by the locking member 70, except when the current path is cut off, a cutting pressing force by the pressing unit 30 and the shielding member 20 is not applied to the fuse element 50 (the plurality of fusible conductor sheets 50*a* to 50*f*). Therefore, deterioration of the fuse element 50 over time is curbed, and disconnection due to the pressing force being applied when the temperature of the fuse element 50 rises in the case in which there is no need to cut off the current path can be prevented.

In the protective element 100 of this embodiment, the fuse element laminate 40 includes the plurality of fusible conductor sheets 50*a* to 50*f* disposed in parallel in the thickness direction, and each of the fusible conductor sheets 50*a* to 50*f* is insulated by being close to or in contact with (in close contact with) the first insulating members 60Aa to 60Af and the second insulating member 60B disposed therebetween. Therefore, a current value flowing through each of the fusible conductor sheets 50*a* to 50*f* becomes small, and a space surrounding the fusible conductor sheets 50*a* to 50*f* becomes extremely narrow, which tends to reduce the scale of arc discharge generated by fusing. In other words, when a fusing space is narrow, there will be less gas in that space, and an amount of "plasma generated by ionization of gas in the space," which serves as a path for current to flow during arc discharge, is also reduced, making it easier to quickly extinguish arc discharge. Therefore, according to the protective element 100 of this embodiment, it is possible to reduce a size and weight of the insulating case 10.

In the protective element 100 of the present embodiment, when the first insulating member 60Aa is disposed between the fusible conductor sheet 50*a* disposed at the lowest portion among the fusible conductor sheets 50*a* to 50*f* and the first holding member 10Ba of the insulating case 10, and also the second insulating member 60B is disposed between each of the fusible conductor sheets 50*f* disposed at the uppermost portion among the fusible conductor sheets 50*a* to 50*f* and the second holding member 10Bb of the insulating case 10, the fusible conductor sheets 50*a* and 50*f* do not in direct contact with the first holding member 10Ba and the second holding member 10Bb. Therefore, since carbide that becomes a conductive path is less likely to be formed on an inner surface of the insulating case 10 due to arc discharge, even if the size of the insulating cases 10 is made smaller, leakage current is less likely to occur.

In the protective element 100 of this embodiment, in the case in which the first insulating members 60Aa to 60Af and the second insulating member 60B are separated at positions facing the fusing portions 53 between the first end portions 51 and the second end portions 52 of the fusible conductor sheets 50*a* to 50*f*, when the fusible conductor sheets 50*a* to 50*f* are fused by the fusing portion 53, it is possible to curb continuous adhesion of melted particles to the surfaces of the first insulating members 60Aa to 60Af and the second insulating member 60B. Therefore, arc discharge generated by the fusing of the fusible conductor sheets 50*a* to 50*f* can be quickly extinguished.

In the protective element 100 of this embodiment, at least one of the first insulating members 60Aa to 60Af, the second insulating member 60B, the shielding member 20, the cover 10A of the insulating case 10, and the holding member 10B is formed of a material having a tracking resistance index CTI of 500V or more. Thus, due to arc discharge, it is difficult to form carbides that serve as conductive paths on surfaces of the parts, and thus even if the size of the insulating case 10 is made smaller, leakage current is less likely to occur.

In the protective element 100 of this embodiment, at least one of the first insulating members 60Aa to 60Af, the second insulating member 60B, the shielding member 20, the cover 10A of the insulating case 10, and the holding member 10B is formed of a polyamide-based resin or fluoro-based resin. Since the polyamide-based resin or fluoro-based resin has excellent insulation properties and tracking resistance, it becomes easy to make the protective element 100 smaller and lighter.

In the protective element 100 of this embodiment, when each of the fusible conductor sheets 50*a* to 50*f* is a laminate including a low melting point metal layer and a high melting point metal layer, and the low melting point metal layer contains Sn and the high melting point metal layer contains Ag or Cu, when the low melting point metal layer is melted, the high melting point metal is thus dissolved by Sn. Therefore, a fusing temperature of the fusible conductor sheets 50*a* to 50*f* becomes low. In addition, since Ag and Cu have higher physical strength than Sn, the physical strength of the fusible conductor sheets 50*a* to 50*f* in which a high melting point metal layer is stacked on a low melting point metal layer is higher than that of the low melting point metal layer alone. Furthermore, Ag and Cu have lower electrical resistivity than Sn, and an electric resistance value of the fusible conductor sheets 50*a* to 50*f* which are formed by stacking a high melting point metal layer on a low melting point metal layer is lower than an electric resistance value of the low melting point metal layer alone. In other words, the fuse element can handle a larger current.

In the protective element 100 of this embodiment, when each of the fusible conductor sheets 50*a* to 50*f* is a laminate in which two or more high melting point metal layers and one or more low melting point metal layers are provided, and the low melting point metal layer is disposed between the high melting point metal layers, since the high melting point metal layers are disposed on the outside, the strength of the fusible conductor sheets 50*a* to 50*f* is increased. In particular, when the first end portion 51 and the first terminal 91, and the second end portion 52 and the second terminal 92 of each of the fusible conductor sheets 50*a* to 50*f* are connected by soldering, deformation of the fusible conductor sheets 50*a* to 50*f* due to heating during soldering becomes less likely to occur.

In the protective element 100 of this embodiment, when each of the fusible conductor sheets 50*a* to 50*f* is a single layer body containing silver or copper, the electrical resistivity tends to be lower than in the case of a laminate of a high melting point metal layer and a low melting point metal layer. Therefore, a thickness of the fusible conductor sheets 50*a* to 50*f* formed of a single layer body containing silver or copper can be reduced even if they have the same area and the same electrical resistance as the fusible conductor sheets 50*a* to 50*f* formed of a laminate of a high melting point metal layer and a low melting point metal layer. When the thickness of the fusible conductor sheets 50*a* to 50*f* is thin, an amount of melted and scattered particles when the fusible conductor sheets 50*a* to 50*f* are fused decreases in proportion to the thickness, and insulation resistance after cutoff is increased.

In the protective element 100 of this embodiment, each of the fusible conductor sheets 50*a* to 50*f* has a through hole 54 provided in the fusing portion 53, and has a fusing portion in which a cross-sectional area of the fusing portion 53 in the energizing direction is smaller than the cross-sectional area of each of the first end portion 51 and the second end portion 52 in the energizing direction. Thus, a portion that is fused when a current exceeding the rating flows through the current path is stabilized. In the protective element 100 of this embodiment, the through hole 54 is provided in the fusing portion 53, but there is no particular restriction on a method for reducing the cross-sectional area of the fusing portion 53. For example, the cross-sectional area of the fusing portion 53 may be reduced by cutting both end portions of the fusing portion 53 into a concave shape or partially reducing the thickness.

(Modified Examples)

Figure 10A:
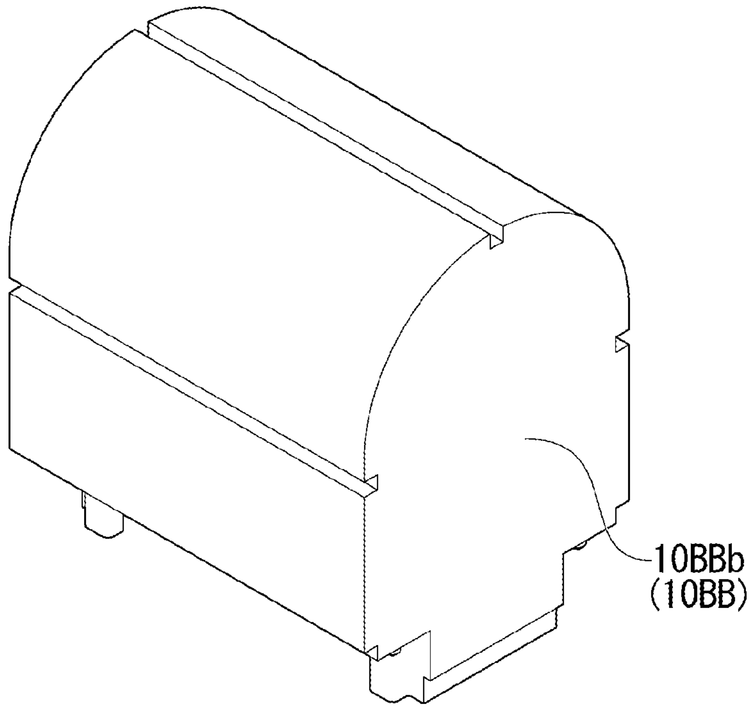
FIG. 10A is a schematic view of a modified example of the first embodiment, and shows a perspective view of a holding member 10BB that is a modified example of a holding member 10B.
Figure 10B:
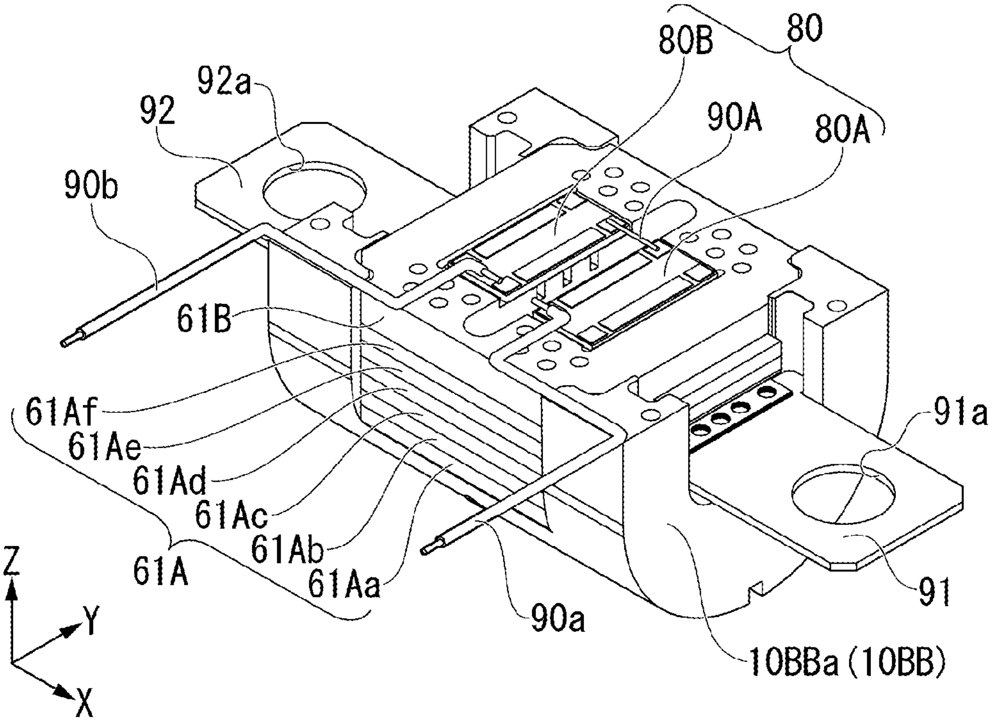
FIG. 10B is a schematic view of a modified example of the first embodiment, and shows a perspective view of the holding member 10BB that is a modified example of the holding member 10B, and a first insulating member 61A and a second insulating member 61B that are modified examples of a first insulating member 60A and a second insulating member 60B.
Figure 11A:
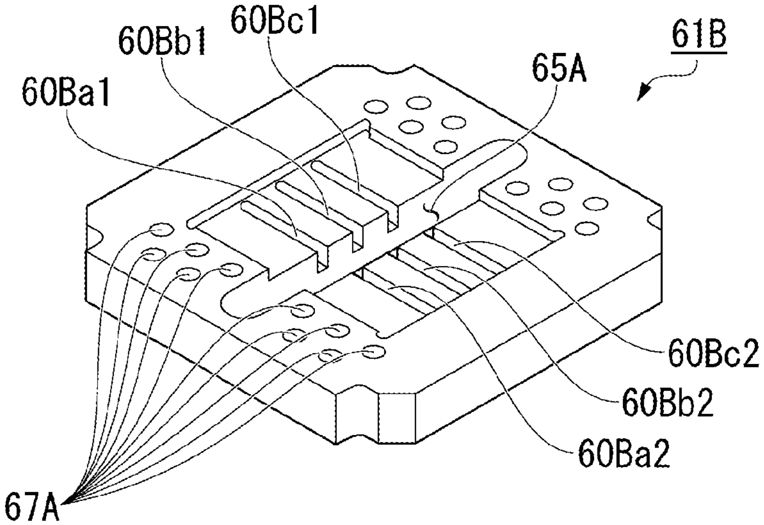
FIG. 11A is a perspective view of the second insulating member 61B of the modified example.
Figure 11B:
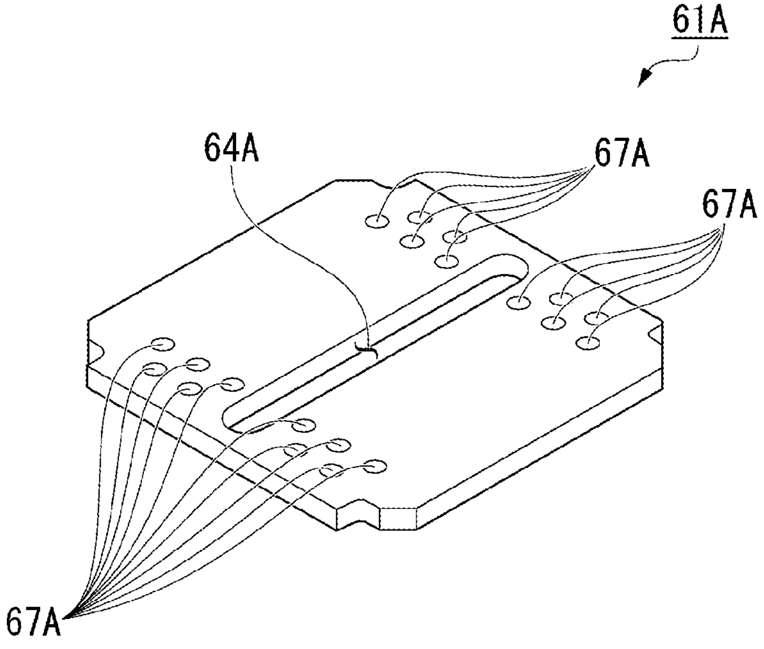
FIG. 11B is a perspective view of the first insulating member 61A of the modified example.

FIGS. 10A and 10B are schematic views of a modified example of the first embodiment. FIG. 10A is a perspective view of a holding member 10BB that is a modified example of the holding member 10B. FIG. 10B is a perspective view of a configuration in which a first insulating member 61A and a second insulating member 61B, which are modified examples of the first insulating member 60A and the second insulating member 60B, have opening portions through which the convex portion 20*a* of the shielding member 20 can move (pass). FIG. 11A is a schematic perspective view of the second insulating member, and FIG. 11B is a schematic perspective view of the first insulating member. Since six first insulating members have the same shape, the first insulating members shown in FIG. 11B have a common configuration.

The configuration of the fuse element laminate in this modified example is similar to that shown in FIGS. 4A to 4C except for the first insulating member. Therefore, in the following description, members common to those shown in FIGS. 4A to 4C will be described with the same reference numerals.

Each of the first insulating members 61Aa to 61Af shown in FIGS. 10B to 11B has a first opening portion 64A, and the second insulating member 61B has a second opening portion 65A. Furthermore, lengths of the first opening portion 64A and the second opening portion 65A in the Y direction are larger than lengths of the fusible conductor sheets 50*a* to 50*f* and the convex portion 20*a* of the shielding member 20 in the Y direction. Thus, after the fusible conductor sheets 50*a* to 50*f* are cut off, the convex portion 20*a* is inserted into the first opening portion 64A and the second opening portion 65A, and the fusing portions of the fusible conductor sheets 50*a* to 50*f* are reliably shielded.

Each of the first insulating members 61Aa to 61Af and the second insulating member 61B has ventilation holes 67A provided at both end sides in the Y direction to efficiently release the pressure increase caused by arc discharge that occurs when the fuse element is cut off into the pressing unit accommodation space of the insulating case. In the shown example, each of the first insulating members 61Aa to 61Af and the second insulating member 61B has five ventilation holes 67A on both sides of the first opening portion 64A or the second opening portion 65A which are both sides in the Y direction, but the number is not limited.

The increased pressure generated by arc discharge passes through the ventilation holes 67A and is efficiently released into the space that accommodates the pressing unit 30 of the insulating case 10 through gaps (not shown) at four corners provided between the pressing unit support portion 20*b* and the second holding member 10BBb. As a result, a shielding operation of the shielding member 20 is performed smoothly, and destruction of the first insulating members 61Aa to 61Af and the second insulating member 61B is prevented.

The first opening portion 64A and the second opening portion 65A are located at positions facing the fusing portion 53 disposed between the first end portion 51 and the second end portion 52 of each of the fusible conductor sheets 50*a* to 50*f*.

Materials of the first insulating members 61Aa to 61Af and the second insulating member 61B are preferably similar to the materials of the first insulating members 60Aa to 60Af and the second insulating member 60B, and the same type of materials can be used.

The holding member 10BB (the second holding member 10BBb disposed on the upper side in the Z direction and the first holding member 10BBa disposed on the lower side in the Z direction) shown in FIGS. 10A and 10B has a shape corresponding to the modified example of the first insulating member and the second insulating member.

Protective Element (Second Embodiment)

FIGS. 12A to 15 are schematic views showing a protective element according to a second embodiment of the present invention. The main difference between the protective element according to the second embodiment and the protective element according to the first embodiment is that the protective element according to the second embodiment does not include the active cutoff mechanism using the heat generating body as a mechanism for cutting off the current path and uses only an overcurrent cutoff mechanism in which the fusible conductor sheet is fused and the current path is cut off when an overcurrent exceeding the rated current flows through the fusible conductor sheet. Specifically, the main difference between the protective element according to the second embodiment and the protective element according to the first embodiment is that the protective element according to the second embodiment does not include the heat generating body and the power supply member.

In the following drawings, constituent members similar to or substantially similar to those of the protective element according to the first embodiment are given the same reference numerals, and description thereof will be omitted.

Figure 12A:
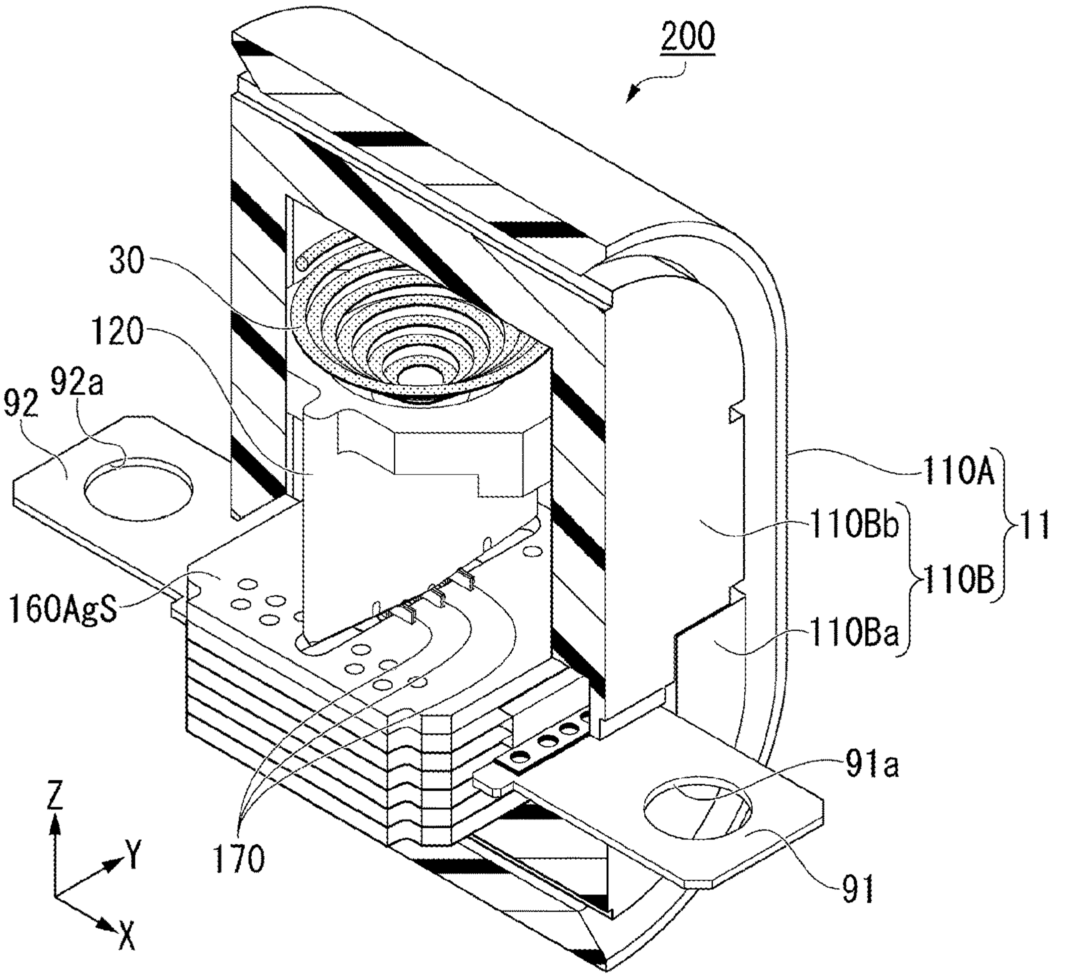
FIG. 12A is a perspective view schematically showing a state in which a portion is removed so that the inside of a protective element according to a second embodiment can be seen.
Figure 12B:
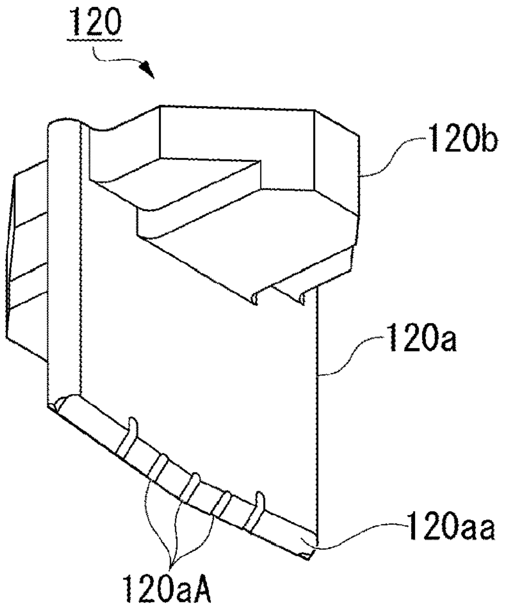
FIG. 12B is a bottom perspective view of a shielding member of FIG. 12A.
Figure 13:
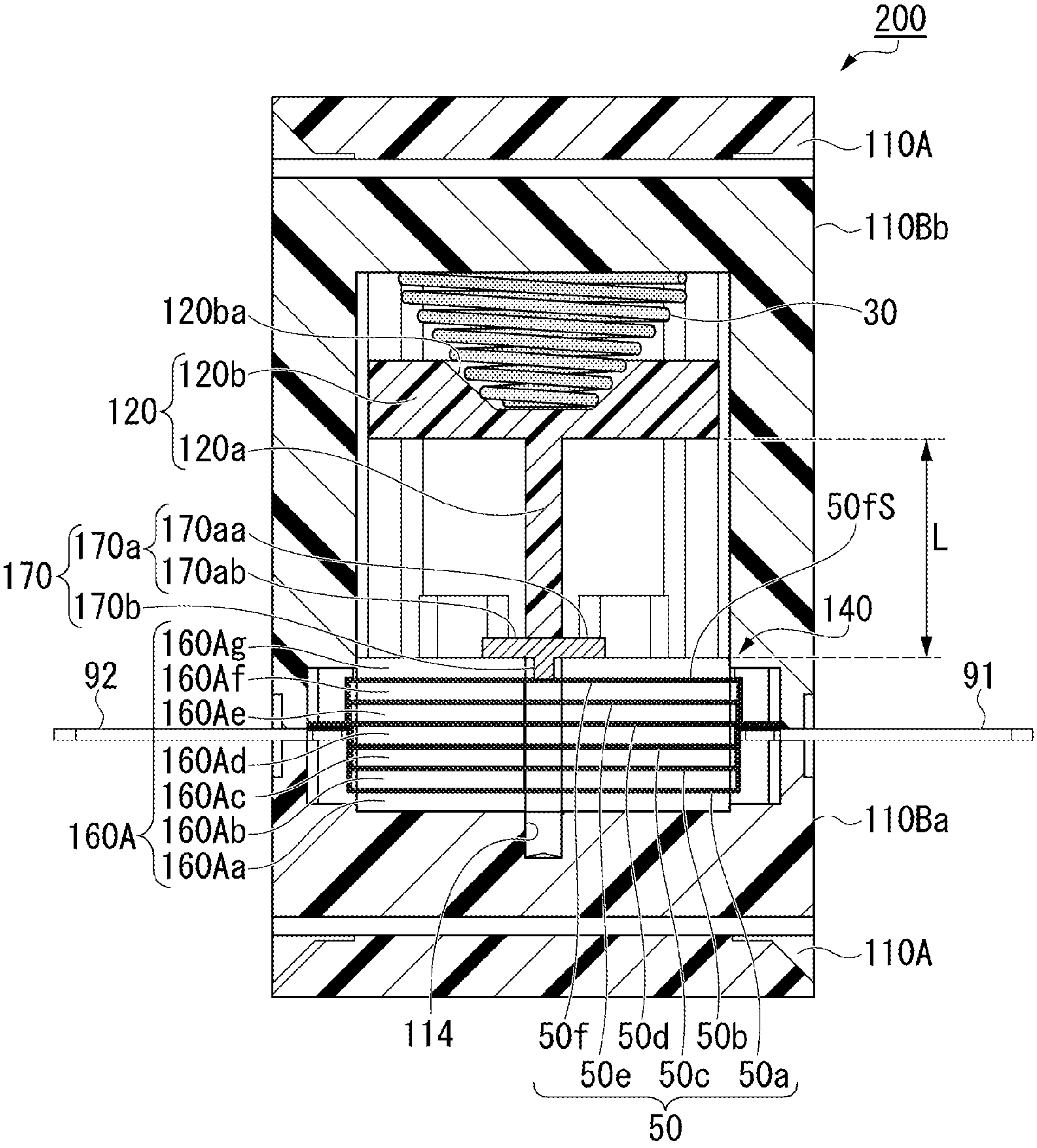
FIG. 13 is a cross-sectional view of the protective element according to the second embodiment which corresponds to FIG. 5.
Figure 14:
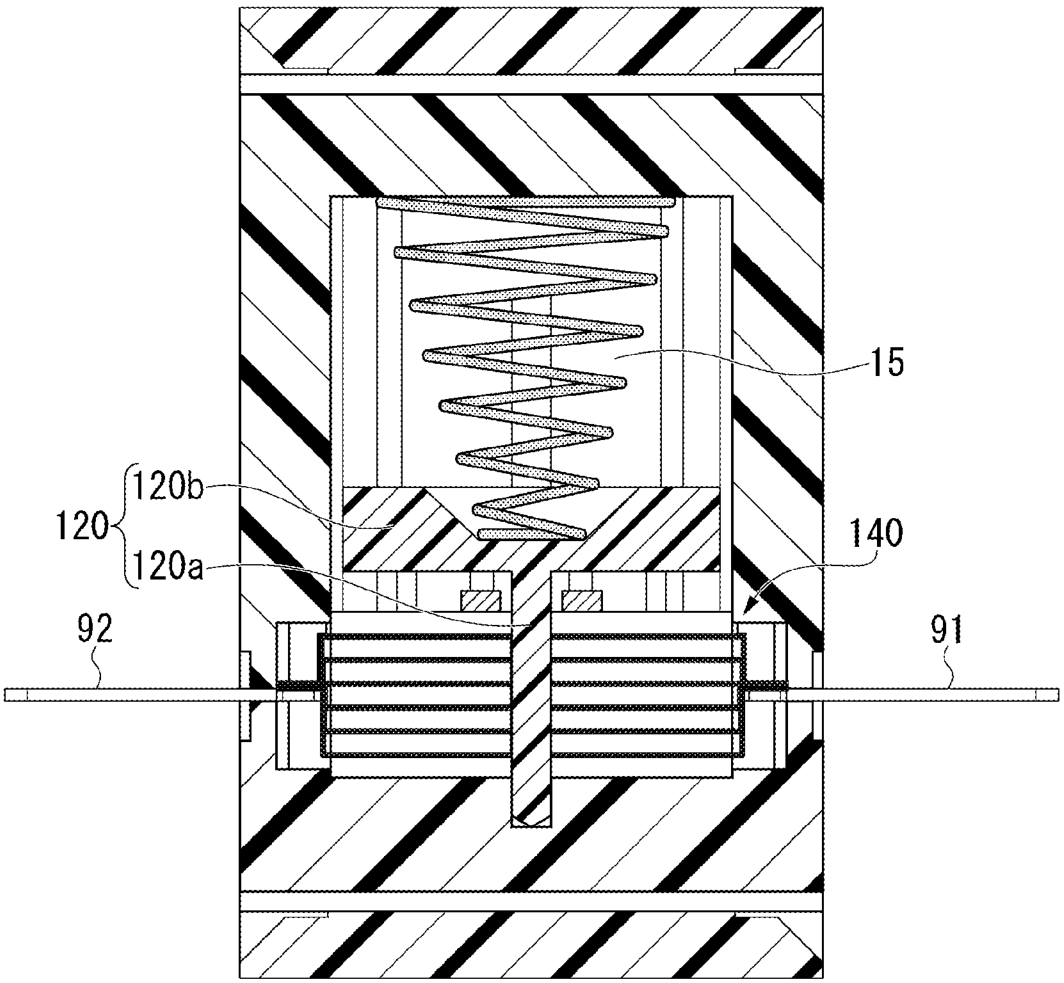
FIG. 14 is a cross-sectional view of the protective element in a state in which the shielding member divides the fuse element and is completely lowered.
Figure 15:
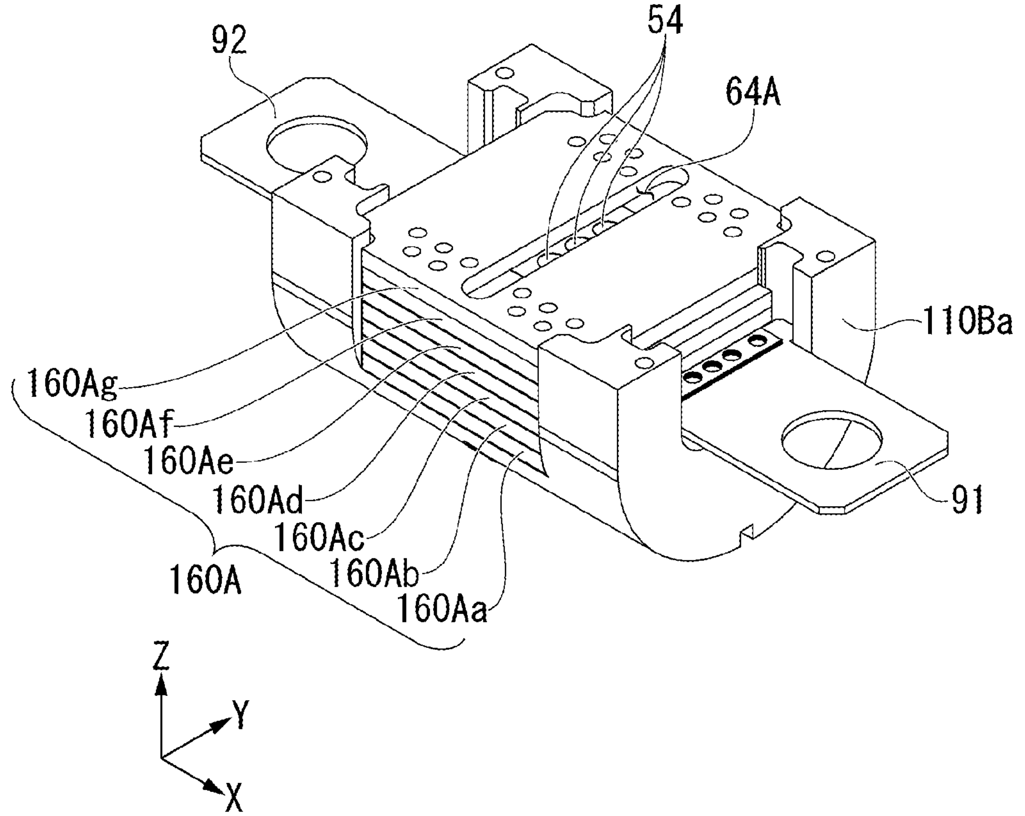
FIG. 15 is a perspective view schematically showing a state in which the fuse element laminate, the first terminal, and the second terminal are installed on the first holding member.

FIG. 12A is a view corresponding to FIG. 2, and is a schematic perspective view showing a state in which a part of the protective element is removed so that the inside thereof can be seen. FIG. 12B is a perspective view of the shielding member. FIG. 13 is a cross-sectional view of the protective element according to the second embodiment which corresponds to FIG. 5. FIG. 14 is a cross-sectional view corresponding to FIG. 6, and is a cross-sectional view of the protective element in a state in which the shielding member has cut the fuse element and is completely lowered. FIG. 15 is a perspective view schematically showing a state in which the fuse element laminate, the first terminal, and the second terminal are installed on the first holding member.

The protective element 200 shown in FIGS. 12A to 15 includes an insulating case 11, a fuse element laminate 140, a first insulating member 160A, a shielding member 120, a pressing unit 30, and a locking member 170. In the protective element 200 of the present embodiment, the energizing direction means a direction in which electricity flows during use (the X direction), and a cross-sectional area in the energizing direction means an area of a plane (a Y-Z plane) perpendicular to the energizing direction.

(Insulating Case)

The insulating case 11 is an approximately long cylindrical shape (a cross section of the Y-Z plane is an ellipse at any position in the X direction). The insulating case 11 includes a cover 110A and a holding member 110B.

Since the protective element 200 does not have a heat generating body and a power supply member, the cover 110A and the holding member 110B are different from the cover 10A and the holding member 10B in that the cover 110A and the holding member 110B do not include a portion for a heat generating body or a portion for a power supply member.

The holding member 110B includes a first holding member 110Ba disposed on the lower side in the Z direction and a second holding member 110Bb disposed on the upper side in the Z direction.

An exterior of each of the cover 110A and the holding member 110B is small and approximately long cylindrical to withstand the increase in internal pressure due to arc discharge, thereby reducing an amount of material used, but according to the rated voltage, rated current, and cutoff capacity of the protective element, the exterior is not limited to the substantially long cylindrical shape, and can take any arbitrary shape such as a rectangular parallelepiped, as long as destruction due to arc discharge does not occur.

An internal pressure buffer space 15 (refer to FIG. 14) is formed inside the holding member 110B. The internal pressure buffer space 15 has an effect of curbing a sudden increase in the internal pressure of the protective element 200 due to gas generated by arc discharge that occurs when the fuse element laminate 140 is fused.

As materials for the cover 110A and the holding member 110B, the same material as the cover 10A and the holding member 10B can be used.

(Fuse Element Laminate)

The fuse element laminate 140 includes a plurality of fusible conductor sheets 50 disposed in parallel in the thickness direction, and a plurality of first insulating members 160A (160Aa to 160Ag) disposed between the plurality of fusible conductor sheets 50 and close to or in contact with the outside of the fusible conductor sheets 50 disposed at a lowest portion and an uppermost portion among the plurality of fusible conductor sheets 50 and in which a first opening portion is formed. The plurality of fusible conductor sheets described above may be collectively referred to as a fuse element 50. The fuse element laminate 140 is configured of a fuse element and a first insulating member.

The plurality of fusible conductor sheets 50 have the same configuration as that shown in FIGS. 4A to 4C, and a description of the above-described features will be omitted. Further, the plurality of first insulating members 160A (160Aa to 160Ag) are all members having the same configuration, and have the same configuration as the first insulating member 61A shown in FIG. 10B, and a description of the above-described characteristics will be omitted.

The protective elements 200 shown in FIGS. 12A to 15 are different in that a first insulating member is provided at a location corresponding to the second insulating member 60B provided in the protective element 100. The protective element 200 may also include an insulating member having a different configuration from the first insulating member, instead of the first insulating member disposed at the uppermost portion.

Here, in the protective element 100, the second insulating member 60B is different from the first insulating member 60A in that it includes a portion in which the heat generating body 80 is disposed. However, it is also possible to substitute a structure similar to that of the first insulating member 60A, in this case, there is no difference in structure between the second insulating member 60B and the first insulating member 60A, and in this case, both the protective element 100 and the fuse element laminate 40 are configured of the fuse element and the first insulating member.

The fuse element laminate 140 has six fusible conductor sheets 50*a*, 50*b*, 50*c*, 50*d*, 50*e*, and 50*f* disposed in parallel in the thickness direction (the Z direction). First insulating members 160Ab, 160Ac, 160Ad, 160Ae, and 160Af are respectively disposed between the fusible conductor sheets 50*a* to 50*f*. The first insulating members 160Ab to 160Af are disposed close to or in contact with each of the fusible conductor sheets 50*a* to 50*f*. In the close state, a distance between the first insulating members 160Ab to 160Af and the fusible conductor sheets 50*a* to 50*f* is preferably 0.5 mm or less, more preferably 0.2 mm or less.

Furthermore, the first insulating member 160Aa is disposed outside the fusible conductor sheet 50*a* which is disposed at the lowest portion among the fusible conductor sheets 50*a* to 50*f*. Further, a first insulating member 160Ag is disposed outside the fusible conductor sheet 50*f* which is disposed at the uppermost portion among the fusible conductor sheets 50*a* to 50*f*. A width (a length in the Y direction) of each of the fusible conductor sheets 50*a* to 50*f* is narrower than a width of each of the first insulating members 160Aa to 160Ag.

Although the fuse element laminate 140 includes six fusible conductor sheets in an example, the number is not limited to six, and any number may be used.

Further, in each of the fusible conductor sheets 50*a* to 50*f*, the fusing portion 53 which is configured to be easily fused is easily cut by the convex portion 120*a* of the shielding member 120.

A thickness of the fusible conductor sheets 50*a* to 50*f* is such that they can be fused by an overcurrent. The specific thickness depends on the material and number of the fusible conductor sheets 50*a* to 50*f* and the pressing force (stress) of the pressing unit 30, and can be set in a range of 0.01 mm or more and 0.1 mm or less, for example, when the fusible conductor sheets 50*a* to 50*f* are formed of copper foils.

Further, when the fusible conductor sheets 50*a* to 50*f* are formed of foils made by plating the periphery of an alloy containing Sn as a main component with Ag, the thickness can be set within a range of 0.1 mm or more and 1.0 mm or less.

Each of the first insulating members 160Aa to 160Ag has a first opening portion 64A in the center in the X direction, through which the convex portion 120*a* of the shielding member 120 can move (pass).

The first insulating members 160Aa to 160Ag have ventilation holes 67A for efficiently releasing the pressure increase caused by arc discharge generated when the fuse element is cut off into the pressing unit accommodation space of the insulating case. In the shown example, each of the first insulating members 160Aa to 160Ag has five ventilation holes 67A on the right and left sides of the first opening portion 64A on both end sides in the Y direction, but the number is not limited.

The increased pressure generated by arc discharge passes through the ventilation holes 67A, and is efficiently released into the space that accommodates the pressing unit 30 of the insulating case 11 through gaps (not shown) at four corners provided between the pressing unit support portion 120*b* and the second holding member 110Bb. As a result, the shielding operation of the shielding member 120 is performed smoothly, and destruction of the first insulating members 160Aa to 160Ag is prevented.

The first opening portion 64A is located at a position facing the fusing portion 53 disposed between the first end portions 51 and the second end portions 52 of the fusible conductor sheets 50*a* to 50*f*.

(Shielding Member)

The shielding member 120 has a convex portion 120*a* that faces the fuse element laminate 140 side, and a pressing unit support portion 120*b* having a concave portion 120*ba* that accommodates and supports a lower portion of the pressing unit 30. A fitting groove 120*a*A for fitting the locking member 170 is provided at a tip end of the convex portion 120*a*. Although the shielding member 120 has three fitting grooves 120*a*A, the number is not limited.

The shielding member 120 is prevented from moving downward by the locking member 170 in a state in which the pressing force of the pressing unit 30 is applied downward. Since a protruding portion 170*b* of the locking member 170 is in contact with the fusible conductor sheet 50*f*, when an overcurrent exceeding the rated current flows through the fusible conductor sheet, the locking member 170 increases in temperature through heat transfer and is softened at a temperature equal to or higher than a softening temperature. Further, when a large overcurrent flows and the fusible conductor sheet 50*f* is instantaneously fused, generated arc discharge also flows to the locking member 170, and the locking member 170 is softened at a temperature equal to or higher than the softening temperature. The softened locking member 170 is easily physically cut by the convex portion 120*a* of the shielding member 120 pressed by the pressing force of the pressing unit 30.

When the locking member 170 is cut and the downward movement restraint by the locking member 170 is removed, the shielding member 120 moves downward and physically cuts the fusible conductor sheets 50*a* to 50*f*.

In the shielding member 120, the tip end 120*aa* of the convex portion 120*a* is sharp and has a shape that makes it easy to cut the fusible conductor sheets 50*a* to 50*f*.

FIG. 14 shows a cross-sectional view of the protective element in a state in which the shielding member 120 moves through the first opening portion 64A of the fuse element laminate 140, and the convex portion 120*a* cuts the fusible conductor sheets 50*a*, 50*b*, 50*c*, 50*d*, 50*e*, 50*f*, and the shielding member 120 is completely lowered.

The shielding member 120 moves downward through the first opening portion 64A of the fuse element laminate 140, and the convex portion 120*a* of the shielding member 120 sequentially cuts the fusible conductor sheets 50*f*, 50*e*, 50*d*, 50*c*, 50*b*, and 50*a*. Then, cut surfaces are shielded and insulated from each other by the convex portions 120*a*, and the energizing path through each of the fusible conductor sheets is physically and reliably cut off. As a result, arc discharge is quickly extinguished (disappears).

In addition, in the state in which the shielding member 120 moves through the first opening portion 64A of the fuse element laminate 140 and is completely lowered, the pressing unit support portion 120*b* of the shielding member 120 presses the fuse element laminate 140 from the first insulating member 160Ag, and the fusible conductor sheet and the first insulating members 160Aa to 160Ag are brought into close contact. Therefore, there is no space in which are discharge can continue, and the arc discharge is surely extinguished.

A thickness (a length in the X direction) of the convex portion 120*a* is smaller than a width in the X direction of the first opening portion 64A of each of the first insulating members 160Aa to 160Ag. With such a configuration, the convex portion 120*a* can move downward in the Z direction through the first opening portion 64A. For example, when the fusible conductor sheets 50*a* to 50*f* are formed of copper foils, a difference between the thickness of the convex portion 120*a* and the width of the first opening portion 64A in the X direction can be, for example, 0.05 to 1.0 mm, and preferably 0.2 to 0.4 mm. When it is 0.05 mm or more, even if end portions of the cut fusible conductor sheets 50*a* to 50*f* with a minimum thickness of 0.01 mm enter the gap between the first insulating members 160Aa to 160Ag and the convex portion 120*a*, the convex portion 120*a* can move smoothly, and arc discharge is extinguished more quickly and reliably. This is because when the difference is 0.05 mm or more, the convex portion 120*a* is less likely to be caught. Furthermore, when the difference is 1.0 mm or less, the first opening portion 64A serves as a guide for moving the convex portion 120*a*. Therefore, position shift of the convex portion 120*a* that moves when the fusible conductor sheets 50*a* to 50*f* are fused is prevented, and arc discharge is extinguished more quickly and reliably. When the fusible conductor sheets 50*a* to 50*f* are formed of a foil formed by plating the periphery of an alloy containing Sn as a main component with Ag, the difference between the thickness of the convex portion 120*a* and the width of the first opening portion 64A in the X direction can be, for example, 0.2 to 2.5 mm, and preferably 0.22 to 2.2 mm.

A width (a length in the Y direction) of the convex portion 120*a* is wider than a width of the fusible conductor sheets 50*a* to 50*f* of the fuse element laminate 140. With such a configuration, the convex portion 120*a* can cut each of the fusible conductor sheets 50*a* to 50*f*.

A length L of the convex portion 120*a* in the Z direction has a length that allows the tip end 120*aa* of the convex portion 120*a* to reach below the first insulating member 160Aa disposed at the lowest position in the Z direction among the first insulating members 160Aa to 160Ag, when the convex portion 120*a* is completely lowered in the Z direction. When the convex portion 120*a* is lowered below the first insulating member 160Aa disposed at the lowest position, the convex portion 120*a* is inserted into an insertion hole 114 formed in an inner bottom surface of the holding member 110Ba.

With such a configuration, the convex portion 120*a* can cut each of the fusible conductor sheets 50*a* to 50*f*.

(Pressing Unit)

The pressing unit 30 is accommodated in the concave portion 120*ba* of the shielding member 120 in a state in which the shielding member 120 is pressed downward in the Z direction.

As the pressing unit 30, the same one as that provided in the protective element 100 can be used.

(Locking Member)

A configuration (a shape and a material) of the locking member 170 may be the same as that of the locking member 70. Although the protective element 200 includes three locking members 170, the number is not limited to three.

The locking member 170 is held in a state in which it is inserted into a fitting groove 120*a*A provided at the tip end 120*aa* of the convex portion 120*a* of the shielding member 120.

The locking member 170 has a T-like shape and includes a horizontally extending portion (a support portion) 170*a* having a first arm portion 170*aa* and a second arm portion 170*ab* and a longitudinally extending portion (a protruding portion) 170*b* that extends downward from a center of the horizontally extending portion 170*a*.

In the protective element 200, each of the first arm portion 170*aa* and the second arm portion 170*ab* of the horizontally extending portion 170*a* are supported by a surface 160AgS of the first insulating member 160Ag on the shielding member side across the first opening portion 64A, and a lower end of the longitudinally extending portion 170*b* is supported by a surface 50*f*S of the fusible conductor sheet 50*f* on the shielding member side. In the shown example, the surface 160AgS of the first insulating member 160Ag on the shielding member side does not have a groove in which the locking member 170 is placed, but may have a groove in which the locking member 170 is placed.

When the longitudinally extending portion 170*b* is supported by the surface 50*f*S of the fusible conductor sheet 50*f* on the shielding member side, and an overcurrent exceeding the rated current flows through the fusible conductor sheet 50*f*, the locking member 170 that is in contact with the fusible conductor sheet 50*f* increases in temperature through heat transfer and is softened at a temperature equal to or higher than the softening temperature.

In the protective element 200, both the horizontally extending portion 170*a* and the longitudinally extending portion 170*b* are supported, but either one may be supported. However, preferably, the longitudinally extending portion 170*b* is supported in contact with the surface 50*f*S of the fusible conductor sheet 50*f* on the shielding member side so as to be softened when an overcurrent exceeding the rated current flows through the fusible conductor sheet 50*f*. When the longitudinally extending portion 170*b* is not in contact with the surface 50*f*S of the fusible conductor sheet 50*f* on the shielding member side, preferably, it is close to the surface 50*f*S on the shielding member side.

All three locking members 170 have the same shape, but may have different shapes.

When the locking member 170 reaches a temperature equal to or higher than a softening temperature, it becomes soft enough to be deformed by an external force.

The softened locking member 170 is easily physically cut by the convex portion 120*a* of the shielding member 120 pressed by a pressing force of the pressing unit 30. When the locking member 170 is cut, the convex portion 120*a* of the shielding member 120 is inserted downward in the Z direction into the first opening portion 64A.

When the convex portion 120*a* is inserted downward in the Z direction into the first opening portion 64A, the convex portion 120*a* advances while cutting the fusible conductor sheet and reaches the lowest position. Therefore, the convex portion 120*a* shields the fusible conductor sheets 50*a* to 50*f* into the first terminal 91 side and the second terminal 92 side with the fusing portion 53. Thus, arc discharge generated when the fusible conductor sheets 50*a* to 50*f* are cut can be extinguished quickly and reliably.

In the locking member 170, the longitudinally extending portion 170*b* is in contact with the fusible conductor sheet 50*f*. Therefore, when an overcurrent exceeding the rated current flows through the fusible conductor sheet, the locking member 170 in contact with the fusible conductor sheet 50*f* increases in temperature through heat transfer and is softened at a temperature equal to or higher than a softening temperature.

Further, when a large overcurrent flows and the fusible conductor sheet 50*f* is instantaneously fused, generated arc discharge also flows to the locking member 170, and the locking member 170 is softened at a temperature equal to or higher than a softening temperature.

The softened locking member 170 is easily physically cut by the convex portion 120*a* of the shielding member 120 pressed by a pressing force of the pressing unit 30. When the locking member 170 is cut, the convex portion 120*a* of the shielding member 120 is inserted downward in the Z direction into the first opening portion 64A.

In this case, the fusible conductor sheet is thermally fused due to the flow of an overcurrent exceeding the rated current, and the convex portion 120*a* is inserted into the first opening portion 64A downward in the Z direction as it is. At this time, the convex portion 120*a* shields the fusible conductor sheets 50*a* to 50*f* into the first terminal 91 side and the second terminal 92 side with the fusing portion. Thus, arc discharge generated when the fusible conductor sheets 50*a* to 50*f* are cut can be extinguished quickly and reliably.

Even if the fusible conductor sheet has not yet been thermally fused, when the convex portion 120*a* is inserted downward in the Z direction into the first opening portion 64A, the convex portion 120*a* advances while cutting the fusible conductor sheet and reaches the lowest position. Thus, the convex portion 120*a* shields the fusible conductor sheets 50*a* to 50*f* into the first terminal 91 side and the second terminal 92 side with the fusing portion. As a result, arc discharge that occurs when the fusible conductor sheets 50*a* to 50*f* are cut off can be extinguished quickly and reliably.

Since the protective element 200 according to the second embodiment has many members that are the same or similar to those of the protective element 100 according to the first embodiment except that it does not include the heat generating body and the power supply member, a description of a manufacturing method thereof will be omitted.

In the protective element 200 of this embodiment, when an overcurrent exceeding the rated current flows through the fuse element 50 (the plurality of fusible conductor sheets 50*a* to 50*f*), the fuse element 50 is thermally fused and the current path is cut off.

In the protective element 200 of this embodiment, since the movement of the shielding member 120 to which a pressing force is applied by the pressing unit 30 is restrained by the locking member 170, a cutting pressing force by the pressing unit 30 and the shielding member 120 is not applied to the fuse element 50 (the plurality of fusible conductor sheets 50*a* to 50*f*), except when the current path is cut off. Therefore, deterioration of the fuse element 50 over time is curbed, and disconnection due to a pressing force being applied when the temperature of the fuse element 50 rises and also there is no need to cut off the current path can be prevented.

In the protective element 200 of this embodiment, the fuse element laminate 140 includes the plurality of fusible conductor sheets 50*a* to 50*f* disposed in parallel in the thickness direction, and each of the fusible conductor sheets 50*a* to 50*f* is insulated by being close to or in contact with (in close contact with) the first insulating members 160Ab to 160Af disposed therebetween and the first insulating members 160Aa to 160Ag disposed outside the fusible conductor sheets 50*a* and 50*f*. Therefore, a value of a current flowing through each of the fusible conductor sheets 50*a* to 50*f* becomes small, and the space surrounding the fusible conductor sheets 50*a* to 50*f* becomes extremely narrow, and the scale of arc discharge generated by fusing becomes small easily. Therefore, according to the protective element 200 of this embodiment, it is possible to reduce a size and weight of the insulating case 11.

In the protective element 200 of the present embodiment, when the first insulating member 160Aa is disposed between the fusible conductor sheet 50*a* disposed at the lowest portion among the fusible conductor sheets 50*a* to 50*f* and the first holding member 110Ba of the insulating case 11, and also the first insulating member 160Ag is disposed between each of the fusible conductor sheets 50*f* disposed at the uppermost portion among the fusible conductor sheets 50*a* to 50*f* and the second holding member 110Bb of the insulating case 11, the fusible conductor sheets 50*a* and 50*f* are not in directly contact with the first holding member 110Ba and the second holding member 110Bb. Thus, carbide that becomes a conductive path is less likely to be formed on the inner surface of these insulating cases 11 due to arc discharge, so even if a size of the insulating cases 11 is made smaller, leakage current is less likely to occur.

In the protective element 200 of this embodiment, the first insulating members 160Aa to 160Ag have openings at positions facing the fusing portions 53 between the first end portions 51 and second end portions 52 of the fusible conductor sheets 50*a* to 50*f*. Thus, when the fusible conductor sheets 50*a* to 50*f* are fused by the fusing portion 53, it is possible to curb the continuous adhesion of melted particles to the surfaces of the first insulating members 160Aa to 160Ag. Therefore, arc discharge generated by the fusing of the fusible conductor sheets 50*a* to 50*f* can be quickly extinguished.

In the protective element 200 of this embodiment, at least one of the first insulating members 160Aa to 160Ag, the shielding member 120, the cover 110A of the insulating case 11, and the holding member 110B is formed of a material with a tracking resistance index CTI of 500V or more. Therefore, carbide that becomes a conductive path is less likely to be formed on the surfaces of these parts due to arc discharge, so even if the size of the insulating case 11 is made smaller, leakage current is less likely to occur.

In the protective element 200 of this embodiment, at least one of the first insulating members 160Aa to 160Ag, the shielding member 120, the cover 110A of the insulating case 11, and the holding member 110B is formed of a polyamide-based resin or fluoro-based resin. Since the polyamide-based resin or fluoro-based resin has excellent insulation properties and tracking resistance, it becomes easy to make the protective element 200 smaller and lighter.

In the protective element 200 of this embodiment, when each of the fusible conductor sheets 50*a* to 50*f* is a laminate including a low melting point metal layer and a high melting point metal layer and the low melting point metal layer contains Sn and the high melting point metal layer contains Ag or Cu, when the low melting point metal layer, is melted, the high melting point metal is thus dissolved by Sn. Thus, a fusing temperature of the fusible conductor sheets 50*a* to 50*f* becomes low. In addition, since Ag and Cu have higher physical strength than Sn, the physical strength of the fusible conductor sheets 50*a* to 50*f* in which a high melting point metal layer is stacked on a low melting point metal layer is higher than that of the low melting point metal layer alone. Furthermore, Ag and Cu have lower electrical resistivity than Sn, and an electric resistance value of the fusible conductor sheets 50*a* to 50*f* in which a high melting point metal layer is stacked on a low melting point metal layer is lower than an electric resistance value of the low melting point metal layer alone. In other words, the fuse element can handle a larger current.

In the protective element 200 of this embodiment, when each of the fusible conductor sheets 50*a* to 50*f* is a laminate in which two or more high melting point metal layers and one or more low melting point metal layers are provided and the low melting point metal layer is disposed between the high melting point metal layers, since there is the high melting point metal layer on the outside, the strength of the fusible conductor sheets 50*a* to 50*f* is increased. In particular, when the first end portion 51 and the first terminal 91, and the second end portion 52 and the second terminal 92 of the fusible conductor sheets 50*a* to 50*f* are connected by soldering, deformation of the fusible conductor sheets 50*a* to 50*f* due to heating during soldering becomes less likely to occur.

In the protective element 200 of this embodiment, when each of the fusible conductor sheets 50*a* to 50*f* is a single layer body containing silver or copper, the electrical resistivity tends to be lower than when it is a laminate of a high melting point metal layer and a low melting point metal layer. Therefore, a thickness of the fusible conductor sheets 50*a* to 50*f* formed of a single layer body containing silver or copper can be reduced even if they have the same area and the same electrical resistance as the fusible conductor sheets 50*a* to 50*f* formed of a laminate of a high melting point metal layer and a low melting point metal layer. When the thickness of the fusible conductor sheets 50*a* to 50*f* is thin, an amount of melted and scattered particles when the fusible conductor sheets 50*a* to 50*f* are cut by fusing decreases in proportion to the thickness, and insulation resistance after cutoff is increased.

In the protective element 200 of this embodiment, each of the fusible conductor sheets 50*a* to 50*f* has a through hole 54 in the fusing portion 53, and has a fusing portion in which a cross-sectional area of the fusing portion 53 in the energizing direction is smaller than a cross-sectional area of the first end portion 51 and the second end portion 52 in the energizing direction. For this reason, portions that are fused when a current exceeding the rating flows through the current path are stabilized. In the protective element 200 of this embodiment, the through hole 54 is provided in the fusing portion 53, but there is no particular restriction on a method for reducing the cross-sectional area of the fusing portion 53. For example, the cross-sectional area of the fusing portion 53 may be reduced by cutting both end portions of the fusing portion 53 into a concave shape or partially reducing a thickness.

Protective Element (Third Embodiment)

A protective element 250 according to a third embodiment of the present invention will be described with reference to FIGS. 16 to 24. The protective element 250 of the third embodiment differs from those of the first and second embodiments described above mainly in the configurations of the shielding member 220 and the locking member 270. In each of the drawings of this embodiment, the same reference numerals or the same names may be given to constituent members that are the same or substantially the same as those in the first and second embodiments, and description thereof may be omitted.

Figure 18:
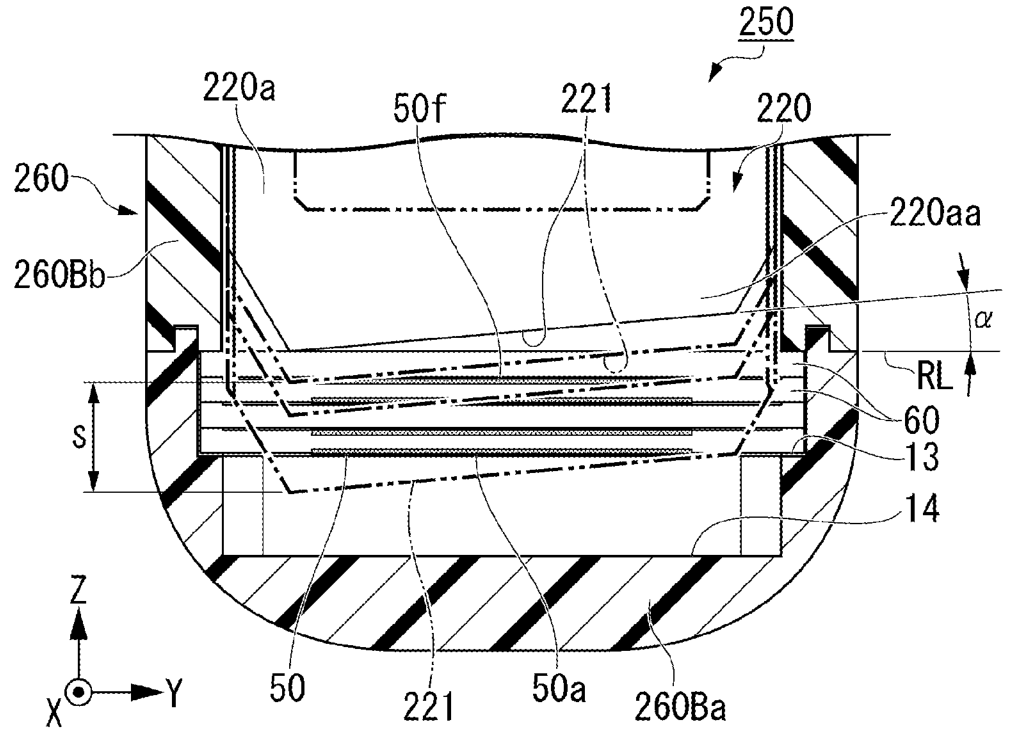
FIG. 18 is a cross-sectional view (a cross-sectional view perpendicular to the energizing direction) for describing a stroke (a cutting stroke) in which the shielding member of the third embodiment cuts the fuse element.
Figure 19:
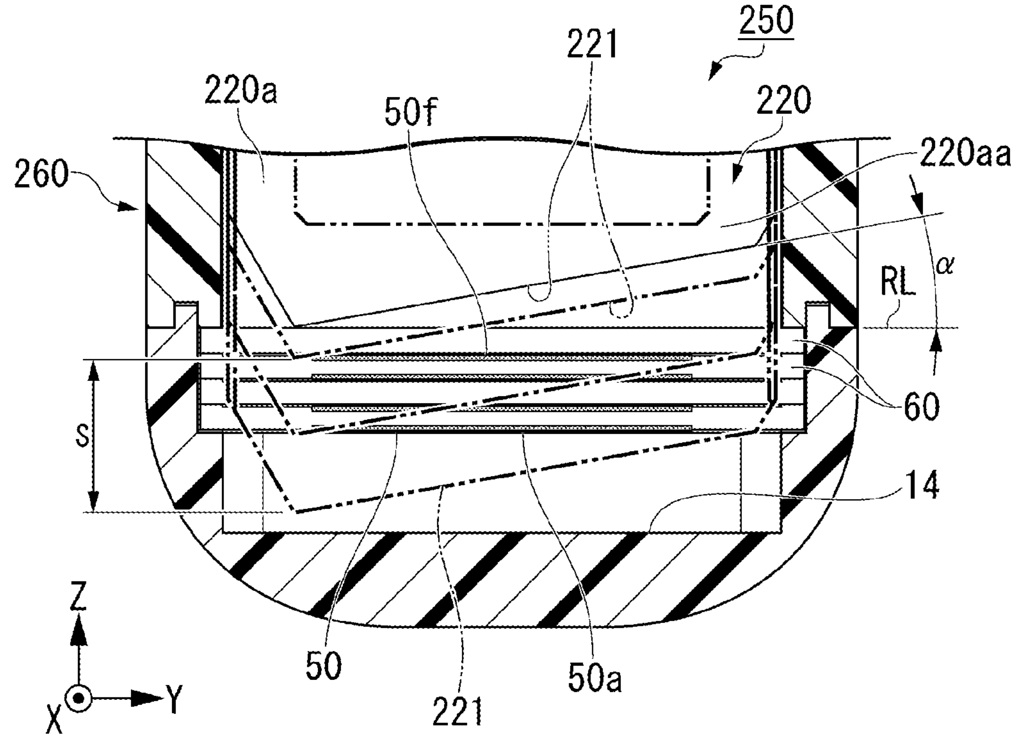
FIG. 19 is a cross-sectional view (a cross-sectional view perpendicular to the energizing direction) for describing the stroke (the cutting stroke) in which the shielding member of the third embodiment cuts the fuse element.

FIGS. 18 and 19 are cross-sectional views showing a part of the protective element 250 of this embodiment, and specifically, are cross-sectional views showing a part of the protective element 250 as a cross section (a cross section along line Y-Z) perpendicular to the energizing direction (the X direction). Moreover, FIG. 20 is a top view showing a part of the protective element 250.

Figure 20:
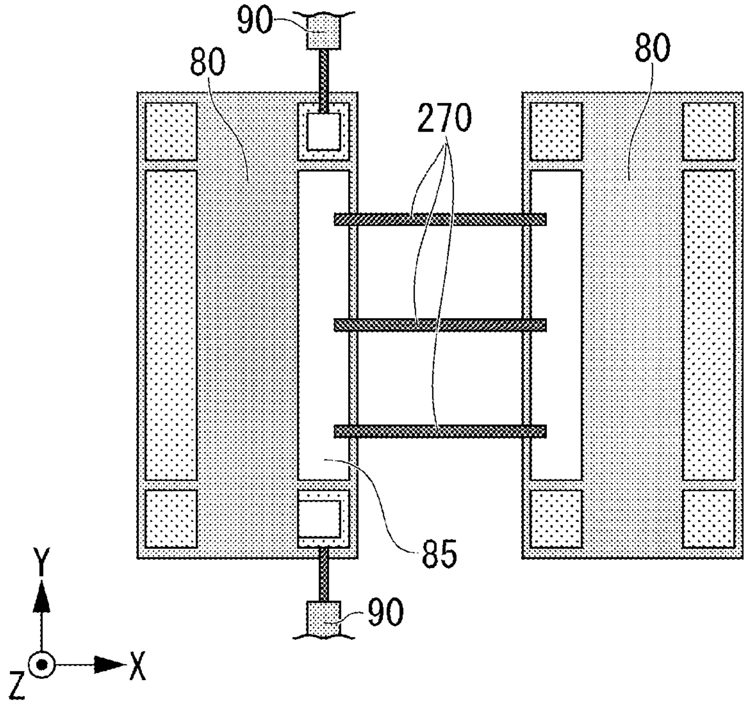
FIG. 20 is a top plan view showing a locking member, a heat generating body, and a power supply member of a protective element according to a third embodiment.

As shown in FIGS. 18 to 20, the protective element 250 includes an insulating case 260, a fuse element (a fusible conductor sheet) 50, a first terminal 91 (not shown), a second terminal 92 (not shown), an insulating member 60, a shielding member 220, a pressing unit 30 (not shown), a heat generating body 80, a locking member 270, a fixing member 85, and a power supply member 90.

(Insulating Case)

The insulating case 260 includes at least two (for example, three in this embodiment) holding members 260Ba, 260Bb, . . . , which are stacked in the up-down direction (the Z direction), and cylindrical cover (not shown) that accommodates the holding members 260Ba, 260Bb . . . . The cover is fitted onto the outside of the plurality of holding members 260Ba, 260Bb . . . . At least two holding members 260Ba, 260Bb . . . are disposed on both sides of the fuse element 50 in the up-down direction.

The insulating case 260 accommodates the fuse element 50, a part of the first terminal 91 (not shown), a part of the second terminal 92 (not shown), the insulating member 60, the shielding member 220, the pressing unit 30 (not shown), the heat generating body 80, the locking member 270, the fixing member 85, and a part of the power supply member 90.

(Fuse Element)

As shown in FIG. 18, a plurality of fuse elements 50 are provided to be arranged in the up-down direction (the thickness direction). In this embodiment, four fuse elements 50 are disposed in parallel in the up-down direction. The insulating members 60 are respectively disposed between the adjacent fuse elements 50 in the up-down direction and above (outside) the fuse element 50 (50*f*) located at the uppermost. Moreover, an inner bottom surface 13 of a holding member 260Ba is disposed close to or in contact with the lower side (the outer side) of the fuse element 50 (50*a*) located at the lowest position. When fuse resistance that achieves a required rated current is obtained, only a single layer (one) of the fuse element 50 may be provided (refer to FIG. 27).

The fuse element 50 has a plate shape extending in the energizing direction. A pair of surfaces (a front surface and a back surface) of the fuse element 50 face in the up-down direction. Since the up-down direction is a direction perpendicular to the surface of the fuse element 50, it may also be referred to as the vertical direction.

The fuse element 50 has a first end portion 51 (not shown) and a second end portion 52 (not shown) that face each other. That is, in other words, the fuse element 50 has the first end portion 51 and the second end portion 52 disposed at both end portions in the energizing direction.

(First Terminal, Second Terminal)

Although not particularly illustrated, one end portion of the first terminal 91 is connected to the first end portion 51 and the other end portion is exposed to the outside from the insulating case 260. Specifically, the other end portion of the first terminal 91 protrudes from the insulating case 260 toward the first terminal 91 side (the +X side) in the energizing direction.

Further, one end portion of the second terminal 92 is connected to the second end portion 52 and the other end portion is exposed to the outside from the insulating case 260. Specifically, the other end portion of the second terminal 92 protrudes from the insulating case 260 toward the second terminal 92 side (the −X side) in the energizing direction.

(Insulating Member)

A plurality of insulating members 60 are provided to be arranged in the up-down direction. In this embodiment, four insulating members 60 are disposed in parallel in the up-down direction. Each of the insulating members 60 is disposed close to or in contact with each of the fuse elements 50. The insulating member 60 has an opening portion or a separation portion formed therein.

(Shielding Member)

As shown in FIGS. 16 to 19, the shielding member 220 is disposed above the fuse element 50. When the restriction on the downward movement by the locking member 270 which will be described below is released, the shielding member 220 is inserted into the opening portion or separation portion of the insulating member 60 and can be moved downward so as to divide the fuse element 50 by a pressing force (which may also be referred to as stress or a biasing force) of the pressing unit 30.

The shielding member 220 has a convex portion 220*a* and a pressing unit support portion 220*b*.

The convex portion 220*a* has a plate shape that extends in a plane (a Y-Z plane) perpendicular to the energizing direction (the X direction). An upper end portion of the convex portion 220*a* is connected to the pressing unit support portion 220*b*. The pressing unit support portion 220*b* has a substantially plate shape that extends in a plane (an X-Y plane) perpendicular to the up-down direction (the Z direction).

The convex portion 220*a* protrudes downward from the pressing unit support portion 220*b*. Specifically, the convex portion 220*a* protrudes toward the opening portion or separation portion of the insulating member 60 and the fuse element 50.

The convex portion 220*a* has a tip end 220*aa* that is disposed at a lower end portion of the convex portion 220*a* and extends in the width direction (the Y direction). The tip end **220*aa* may also be referred to as a blade portion 220*aa*. In a cross section (an X-Z cross section) perpendicular to the width direction, the tip end 220*aa* has a V-shape that is convex downward. A blade edge angle β of the tip end 220*aa*** shown in the cross section is, for example, 10° or more and 90° or less.

The tip end **220*aa* has a first inclined blade 221 that extends downward as nearing one side in the width direction (the −Y side). The first inclined blade 221 overlaps at least half of an entire length of the fuse element 50 in the width direction (the Y direction) when seen from the up-down direction. In this embodiment, the first inclined blade 221 overlaps the fuse element 50 over the entire length in the width direction when seen from the up-down direction (refer to FIGS. 18 and 19**).

That is, a widthwise dimension of the first inclined blade 221 is larger than half of a widthwise dimension of the fuse element 50. In this embodiment, the widthwise dimension of the first inclined blade 221 is larger than the widthwise dimension of the fuse element 50.

Figure 16:
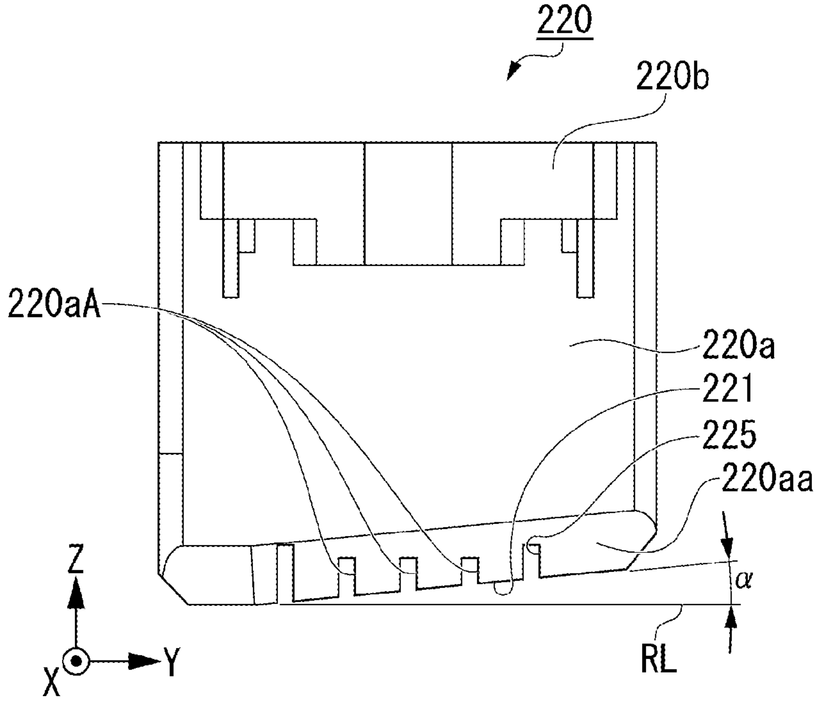
FIG. 16 is a front view of a shielding member of a protective element according to a third embodiment when seen in an energizing direction.
Figure 17:
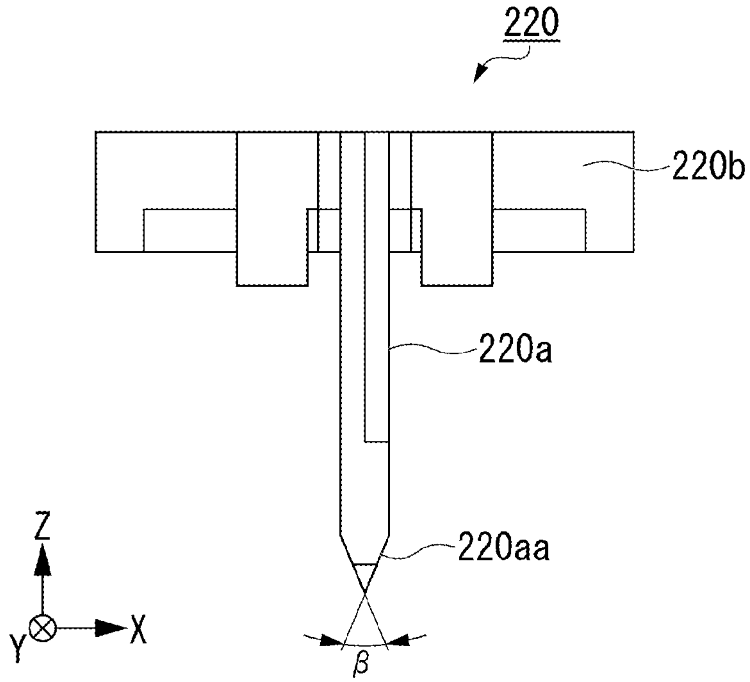
FIG. 17 is a side view of the shielding member of the protective element according to the third embodiment when seen in a width direction.

As shown in FIGS. 16, 18, and 19, an inclination angle α at which the first inclined blade 221 is inclined with respect to a reference line RL extending in the width direction when seen in the energizing direction (the X direction) is, for example, 3° or more and 27° or less. FIG. 18 shows an example in which the inclination angle α is 5°, and FIG. 19 shows another example in which the inclination angle α is 10°. As the inclination angle α becomes larger, sharpness (cutting ability) of the first inclined blade 221 tends to increase, but an up-down stroke S (hereinafter, sometimes referred to as a cutting stroke S) required to cut the fuse element 50 increases.

As shown in FIG. 16, the tip end **220*aa* further has a fitting groove 220*a*A provided in a lower surface of the tip end 220*aa* and extending in the up-down direction. A plurality of fitting grooves 220*a*A are provided to be arranged in the width direction (the Y direction). The number of fitting grooves 220*a*A is the same as or more than the number of locking members 270** (described below) (that is, the same number or more), and for example, is three in this embodiment.

A position of an upper end of each of the fitting grooves **220*a*A in the up-down direction is the same. The position of a lower end of each of the fitting grooves 220*a*A in the up-down direction is different from each other because the first inclined blade 221 is inclined. Therefore, dimensions of the fitting grooves 220*a*A** in the up-down direction are different from each other.

A groove indicated by a reference numeral 225 in FIG. 16 is a power supply member insertion groove. The power supply member 90A is inserted into the power supply member insertion groove 225, for example, when the power supply member 90A shown in FIG. 9A is used.

Since the power supply member 90A is disposed across the shielding member 220, the power supply member 90A is cut or released at a stage when the shielding member 220 moves toward the fuse element 50, and the heat generation of the heat generating body 80 can be automatically stopped.

In FIGS. 18 and 19, illustration of the fitting groove **220*a*A and the power supply member insertion groove 225** is omitted.

(Pressing Unit)

Although not particularly shown, the pressing unit 30 is disposed above the shielding member 220. Specifically, the pressing unit 30 is placed on an upper surface of the pressing unit support portion **220*b*. A part of the pressing unit 30 is disposed within a concave portion provided in the upper surface of the pressing unit support portion 220*b***.

The pressing unit 30 presses the shielding member 220 downward. Specifically, the pressing unit 30 is a spring (a biasing member) such as an elastically deformable compression coil spring, is assembled into the protective element 250 in a state in which it is contracted and elastically deformed in the up-down direction, and presses the pressing unit support portion **220*b*** downward by a pressing force (stress, a biasing force) caused by a restoring deformation force.

(Heat Generating Body, Fixing Member, Power Supply Member)

As shown in FIG. 20, a pair of heat generating bodies 80 are provided with a gap therebetween in the energizing direction (the X direction). The heat generating body 80 heats and softens the locking member 270 or the fixing member 85 that fixes the locking member 270 to the heat generating body 80. In this embodiment, the fixing member 85 is, for example, solder. In this embodiment, the heat generating body 80 softens the fixing member 85.

An example of a configuration in which the locking member 270 is fixed to the heat generating body 80 by the fixing member 85 will be described. The heat generating body 80 is formed of, for example, a ceramic substrate formed of alumina, and a resistor is printed on the ceramic substrate at a position directly below a connection portion between the fixing member 85 and the power supply member 90. Silver paste is printed on the resistor through a glass layer. For example, Ni—Au plating is provided on a surface of the silver paste. The solder (the fixing member 85) is applied after the printing of silver paste, and the locking member 270 and the power supply member 90 are fixed on the heat generating body 80 with the solder. With such a configuration, the resistor generates heat by energizing the power supply member 90, and the fixing member 85 can be softened and melted. The present invention is not limited to the above configuration, and for example, a resistor may be printed on the entire surface of the ceramic substrate, and the entire surface of the ceramic substrate may be heated by energization of the power supply member 90.

The power supply member 90 supplies a current to the heat generating body 80. In the example shown in FIG. 20, two power supply members 90 are connected to only one of the pair of heat generating bodies 80. That is, one heat generating body 80 serves as a heater (has a heat generating function), but the other heat generating body 80 does not have a heating function. Therefore, the other heat generating body 80 may be renamed to a member other than the heat generating body 80. That is, in this embodiment, at least one heat generating body 80 may be provided.

Since the other heat generating body 80 that is not connected to the power supply member 90 does not need a heat generating function, it is not necessary to provide the resistor and the glass layer on the ceramic substrate. Then, for example, the solder (the fixing member 85) is applied after the printing of the silver paste, and the locking member 270 is fixed on the heat generating body 80 with the solder.

(Locking Member)

Figure 21:
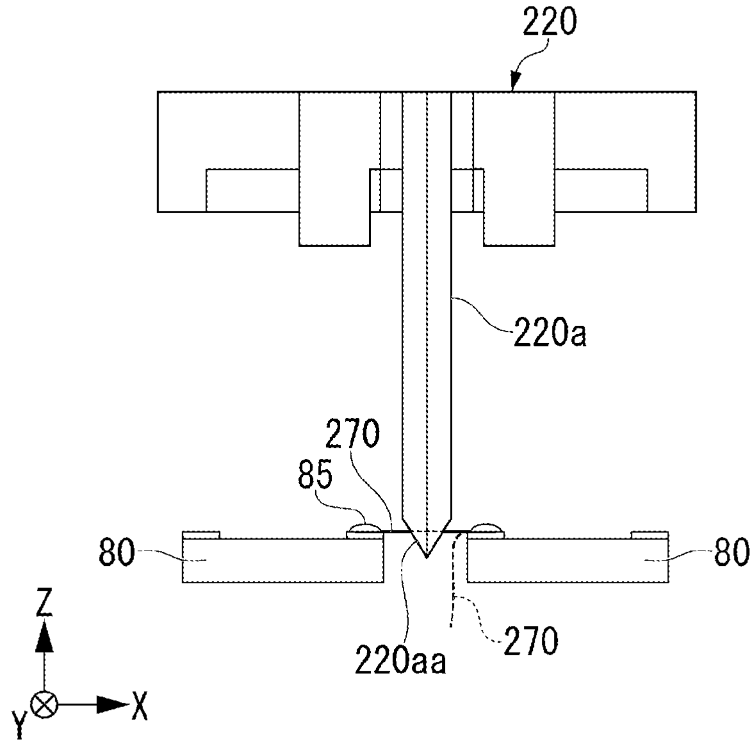
FIG. 21 is a side view showing a shielding member, the locking member, and the heat generating body of the protective element according to the third embodiment.

FIG. 21 is a side view showing a part of the protective element 250. As shown in FIG. 21, the locking member 270 comes into contact with the tip end **220*aa* of the shielding member 220 from below. The locking member 270 supports the tip end 220*aa* from below. Thus, the locking member 270 restrains (restricts) the downward movement of the shielding member 220**.

As shown in FIGS. 20 and 21, the locking member 270 of this embodiment is a wire formed of, for example, copper wire. The locking member 270 is disposed above the opening portion or separation portion of the insulating member 60 and extends in the energizing direction.

Both end portions of the locking member 270 in the energizing direction are supported by a pair of support members, and at least one of the pair of support members is the heat generating body 80. The locking member 270 is spanned between the pair of support members (in this embodiment, a pair of heat generating bodies 80). That is, the locking member 270 bridges the pair of support members.

A plurality of locking members 270 are provided to be arranged in the width direction, and in this embodiment, for example, three locking members are provided. Each of the locking members 270 is inserted into each of the fitting grooves 220*a*A of the tip end 220*aa* of the convex portion 220*a*. Each of the locking members 270 comes into contact with an upper end of the inner circumference of each of the fitting grooves 220*a*A from below. Thus, the locking member 270 supports the tip end 220*aa* from below.

When the locking member 270 or the fixing member 85 is softened, and the restriction on the downward movement of the shielding member 220 by the locking member 270 is released, the shielding member 220 moves downward due to the pressing force of the pressing unit 30. As the shielding member 220 moves downward, at least a part of the locking member 270 is inserted into the opening portion or separation portion of the insulating member 60 together with the convex portion 220*a* (refer to the locking member 270 indicated by a broken line in FIG. 21).

Specifically, as the shielding member 220 moves downward, one end portion of the locking member 270 in the energizing direction remains in a supported state, and the other end portion is released from the supported state and inserted into the opening portion or separation portion. In this embodiment, since only one of the pair of heat generating bodies 80 has a heat generation function, as the shielding member 220 moves downward, one end portion of each of the locking members 270 in the energizing direction remains in the supported state, and the other end is released from the supported state and inserted into the opening portion or separation portion. That is, as shown by a broken line in FIG. 21, all the locking members 270 are supported in a cantilevered state by the other heat generating body 80 (the support member).

In the protective element 250 of this embodiment, when an overcurrent exceeding the rated current flows through the fuse element 50, the fuse element 50 is thermally fused to cut off the current path. In addition to the above, it is possible to physically cut the fuse element 50 and to cut off the current path by softening the locking member 270 or the fixing member 85 that restrains the movement of the shielding member 220 by applying a current to the heat generating body 80 and moving the shielding member 220 by the pressing force of the pressing unit 30.

Further, in this embodiment, the fuse element 50 and the insulating member 60 are close to or in contact with each other, preferably in close contact with each other. Therefore, there is no space between the fuse element 50 and the insulating member 60 in which arc discharge can continue, and arc discharge is reliably extinguished.

According to the protective element 250 of this embodiment, when the shielding member 220 moves downward to cut the fuse element 50, the first inclined blade 221 cuts into a region that exceeds half of the entire length of the fuse element 50 in the width direction. That is, cutting of the fuse element 50 by the convex portion 220*a* starts from a position shifted from the center in the width direction.

Figure 22:
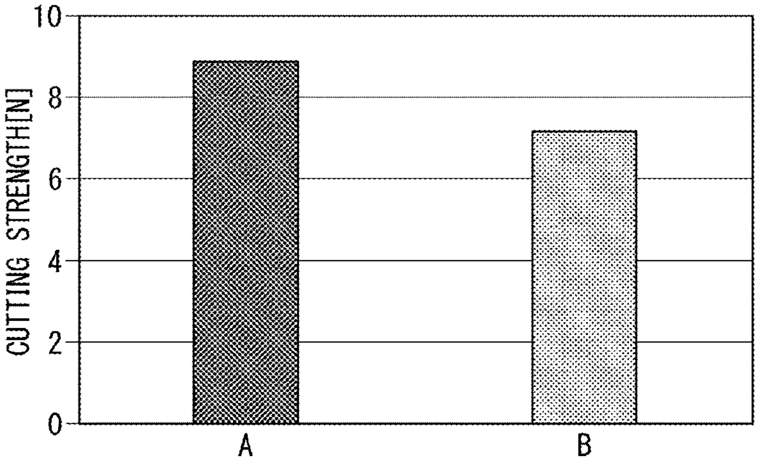
FIG. 22 is a bar graph showing a cutting strength when the shielding member cuts the fuse element. Specifically, a bar graph A shows a cutting strength when cutting is started from a center of the fuse element in the width direction by the shielding member, and a bar graph B shows a cutting strength when cutting is started from one end portion of the fuse element in the width direction by the shielding member of the third embodiment.

Therefore, as shown in FIG. 22, compared to, for example, when cutting is started from the center of the fuse element 50 in the width direction (bar graph A), when cutting is started from an end portion of the fuse element 50 on one side (−Y side) in the width direction (bar graph B) as in this embodiment, cutting strength can be kept low. In this embodiment, "cutting strength" refers to a magnitude of force required to cut a target (the fuse element 50).

Specifically, when the tip end 220*aa* of the convex portion 220*a* cuts through the fuse element 50, and cutting starts from the center in the width direction, a cutting force is almost evenly distributed at two points (two locations) until the cutting is completed, and thus the cutting strength tends to increase. On the other hand, when cutting is started from a portion other than the center in the width direction as in this embodiment, the cutting force can be easily concentrated at approximately one point (one location) early from the start of cutting or throughout the entire cutting process, and thus it is possible to keep the cutting strength low.

Thus, for example, the fuse element 50 can be cut with a small pressing force by the small pressing unit 30. Therefore, it is possible to reduce a size of the protective element 250 and to reduce the cost of parts. Alternatively, since it is possible to cut even a thick fuse element 50 with a low resistance, it is easy to cope with an increase in the rated current.

According to this embodiment, it is possible to stabilize a current cutoff function of the shielding member 220, and the current can be reliably cut off in the fuse element 50.

Further, in this embodiment, the first inclined blade 221 overlaps the fuse element 50 over the entire length in the width direction when seen in the up-down direction.

According to the above configuration, the cutting force by the convex portion 220*a* can be easily concentrated on one point. Therefore, the cutting strength can be kept smaller.

Further, in this embodiment, the inclination angle $\alpha$ at which the first inclined blade 221 is inclined is 3° or more and 27° or less.

Figure 23:
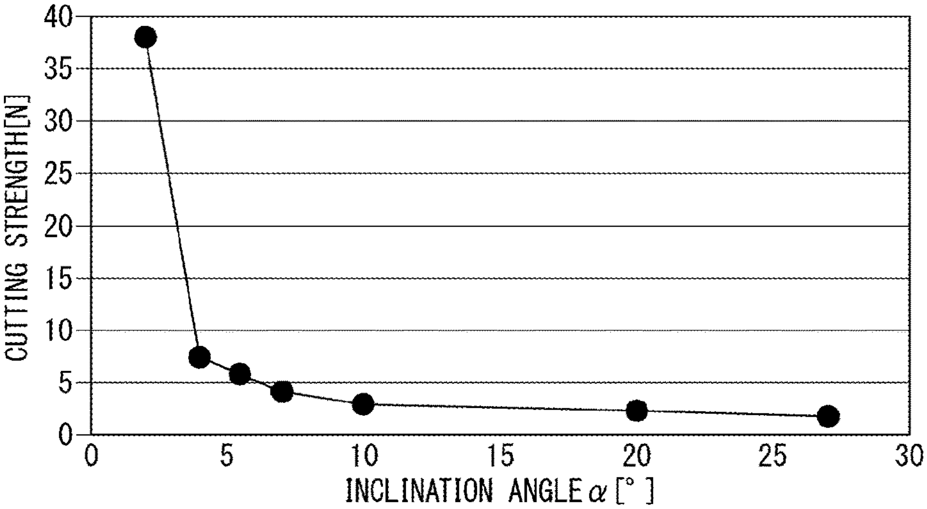
FIG. 23 is a line graph showing a relationship between the cutting strength and an inclination angle of a first inclined blade at a tip end (a blade portion) of a convex portion of the shielding member.

FIG. 23 is a graph showing a relationship between the inclination angle $\alpha$ of the first inclined blade 221 and the cutting strength. As shown in FIG. 23, the cutting strength by the first inclined blade 221 can be stably kept small within the above range of the inclination angle $\alpha$. Specifically, when the inclination angle $\alpha$ is less than 3°, the cutting strength may become too high. Furthermore, when the inclination angle $\alpha$ exceeds 27°, the cutting stroke S of the convex portion 220*a* becomes too large, which may affect an external dimension of the insulating case 260 in the up-down direction. The inclination angle $\alpha$ is preferably 3° or more and 20° or less, more preferably 4° or more and 10° or less.

Further, in this embodiment, the blade edge angle $\beta$ of the tip end 220*aa* is 10° or more and 90° or less.

Figure 24:
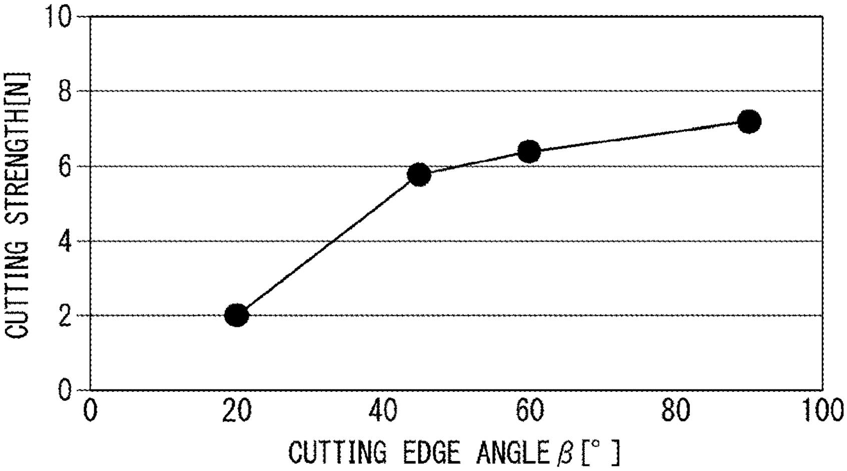
FIG. 24 is a line graph showing a relationship between the cutting strength and a blade edge angle at the tip end (the blade portion) of the convex portion of the shielding member.

FIG. 24 is a graph showing a relationship between the blade edge angle $\beta$ of the tip end 220*aa* and the cutting strength. As shown in FIG. 24, the cutting strength by the tip end (the blade portion) 220*aa* of the convex portion 220*a* can be stably kept small within the above range of the blade edge angle $\beta$. Specifically, when the blade edge angle $\beta$ is less than 10°, there is a risk that cutting edge chipping (blade chipping) or the like may occur. Furthermore, when the blade edge angle $\beta$ exceeds 90°, the cutting strength may become too high.

The blade edge angle $\beta$ is preferably 20° or more and 60° or less, more preferably 20° or more and 45° or less.

Furthermore, in this embodiment, since the locking member 270 is formed of a wire, when the restriction on the downward movement of the shielding member 220 is released, the locking member 270 is pushed by the convex portion 220*a* and is inserted into the opening portion or separation portion of the insulating member 60 together with the convex portion 220*a* while hanging down in a cantilevered state. It is possible to stably prevent a problem in which when the shielding member 220 moves downward, the downward movement is obstructed by the locking member 270 inserted into the opening portion or separation portion. More specifically, for example, it is possible to prevent a problem in which the plate-shaped locking member is cut off by fusing or the like, and cools and hardens inside the opening portion or separation portion, and the cutting operation of the fuse element 50 is inhibited by the shielding member 220.

Further, in this embodiment, as the shielding member 220 moves downward, one end portion of the locking member 270 in the energizing direction remains in the supported state, and the other end portion is released from the supported state and inserted into the opening portion or separation portion of the insulating member 60.

According to the above configuration, when the restriction on the downward movement of the shielding member 220 is released, one end portion of the locking member 270 in the energizing direction is maintained in the supported state. Since the locking member 270 is prevented from falling off from the opening portion or separation portion, it is possible to restrain a problem in which the cutting operation by the shielding member 220 is obstructed by the fallen-off locking member 270.

Further, in this embodiment, only one of the pair of heat generating bodies 80 generates heat, and thus the locking member 270 or the fixing member 85 (the fixing member 85 in this embodiment) is softened. Thus, as the shielding member 220 moves downward, one end portion of each of the locking members 270 in the energizing direction remains in the supported state, and the other end portion is released from the supported state and inserted into the opening portion or separation portion.

According to the above configuration, when the restriction on the downward movement of the shielding member 220 is released, all the locking members 270 can be disposed on one surface side of the convex portion 220*a* inside the opening portion or separation portion. Unlike the above configuration, for example, compared to the case in which a plurality of locking members 270 are disposed on both surfaces (both sides) of the convex portion 220*a* inside the opening portion or separation portion, the downward movement of the convex portion 220*a* is performed more smoothly in this embodiment. Further, since a space (a clearance) between the opening portion or separation portion and the convex portion 220*a* can be kept small, arc discharge can be curbed more stably.

Further, in this embodiment, the shielding member 220 can be stably supported from below by inserting the locking member 270 formed of a wire into the fitting groove 220*a*A.

Furthermore, in this embodiment, a plurality of locking members 270 are provided to be arranged in the width direction, and the number of fitting grooves 220*a*A that is the same as or more than the number of locking members 270 are arranged in the width direction, and upper end positions of the fitting grooves 220*a*A are the same.

According to the above configuration, a force with which each of the locking members 270 supports (an upper end of) each of the fitting grooves 220*a*A from below is equalized. The pressing force transmitted from the pressing unit 30 via the shielding member 220 is evenly distributed to the plurality of locking members 270, and the downward movement of the shielding member 220 can be stably restrained by each of the locking members 270.

(Modified Example)

Figure 25:
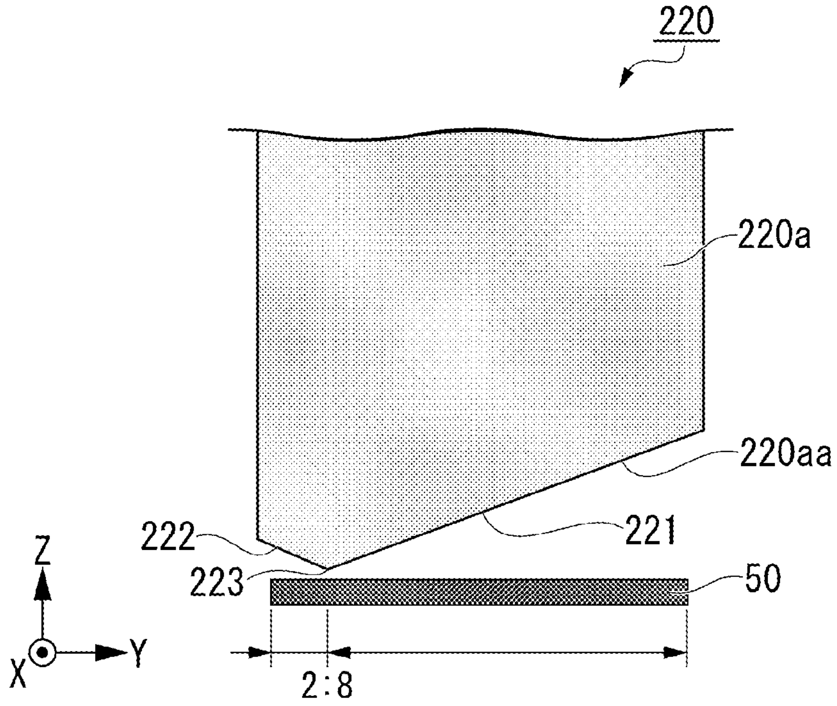
FIG. 25 is a cross-sectional view or a front view schematically showing a shielding member and a fuse element according to a modified example of the third embodiment.
Figure 26:
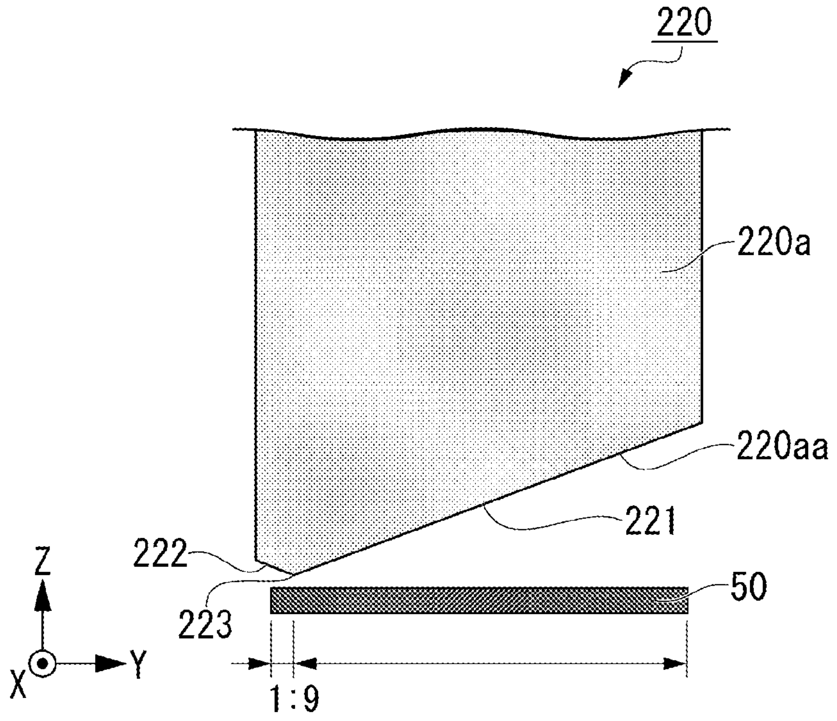
FIG. 26 is a cross-sectional view or a front view schematically showing a shielding member and a fuse element according to a modified example of the third embodiment.

FIGS. 25 and 26 are perspective views schematically showing a shielding member 220 and a fuse element 50 according to a modified example of the third embodiment. In this modified example, the tip end 220*aa* of the convex portion 220*a* further has a second inclined blade 222 and a protruding end (a blade apex) 223.

The second inclined blade 222 is disposed on one side of the first inclined blade 221 in the width direction, and extends downward as nearing the first inclined blade 221. That is, the second inclined blade 222 has an inclination direction opposite to that of the first inclined blade 221, and specifically extends downward as nearing the other side in the width direction. A blade length of the second inclined blade 222 is shorter than a blade length of the first inclined blade 221.

The protruding end 223 is a portion of the tip end 220*aa* that connects the first inclined blade 221 and the second inclined blade 222. When seen in the energizing direction, the protruding end 223 has a downwardly convex shape, for example, an obtuse V-shape.

The second inclined blade 222 and the protruding end 223 overlap a part of the fuse element 50 when seen in the up-down direction. That is, in this modified example, the first inclined blade 221, the second inclined blade 222, and the protruding end 223 cut into the fuse element 50 to cut the fuse element 50.

In the example shown in FIG. 25, the protruding end 223 cuts into a position with a widthwise ratio (proportion) of 8:2, assuming that the total widthwise length of the fuse element 50 is 10. In this case, a ratio of a width direction dimension in which the first inclined blade 221 cuts the fuse element 50 to a width direction dimension in which the second inclined blade 222 cuts the fuse element 50 is also approximately 8:2.

In the example shown in FIG. 26, the protruding end 223 cuts at a position with a widthwise ratio (ratio) of 9:1, assuming the total widthwise length of the fuse element 50 is 10. In this case, a ratio of the width direction dimension in which the first inclined blade 221 cuts the fuse element 50 to the width direction dimension in which the second inclined blade 222 cuts the fuse element 50 is also approximately 9:1.

According to this modified example, cutting of the fuse element 50 starts from the protruding end (the blade apex) 223 of the tip end (the blade portion) 220*aa* of the convex portion 220*a*, and the fuse element 50 is cut into both sides in the width direction by the first inclined blade 221 and the second inclined blade 222. Compared to the case in which the fuse element 50 is cut only by the first inclined blade 221 as in the third embodiment described above, in this modified example, it is possible to further curb the cutting stroke (the stroke from the start of cutting to the completion of cutting) S of the convex portion 220*a* in the up-down direction. Alternatively, it is possible to curb the cutting strength to a smaller level by ensuring a larger inclination angle α of the first inclined blade 221 and improving the cutting quality while the predetermined cutting stroke S is maintained.

(Modified Example)

Figure 27:
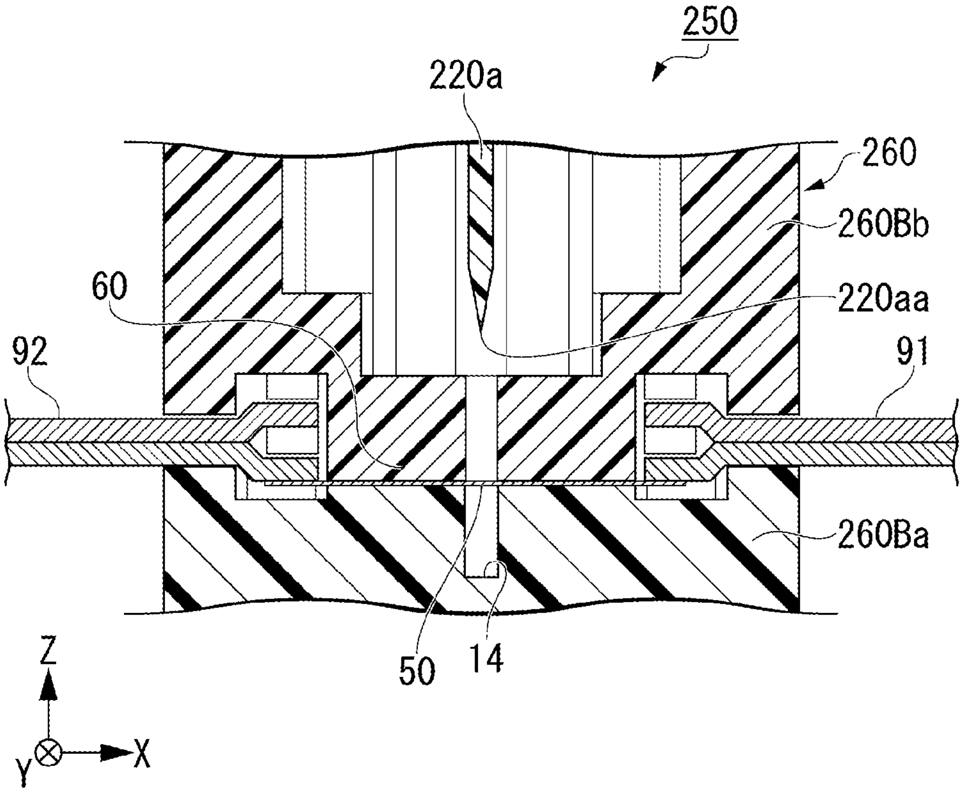
FIG. 27 is a cross-sectional view (a cross-sectional view along line X-Z) showing a part of a protective element according to a modified example of the third embodiment.

FIG. 27 is a cross-sectional view (a cross-sectional view along line X-Z) showing a part of the protective element 250 of a modified example of the third embodiment. In this modified example, one or both of the two holding members 260Ba and 260Bb of the insulating case 260 are formed integrally with the insulating member 60. In the shown example, one (the holding member 260Bb) of the two holding members 260Ba and 260Bb is formed integrally with the insulating member 60. Furthermore, only a single (one) layer of the fuse element 50 is provided.

In the above configuration, the insulating member 60 is integrated with the holding members 260Ba and 260Bb. Therefore, it is possible to reduce the number of parts, to facilitate manufacturing of the protective element 250, and to reduce manufacturing costs.

The protective element of the present invention is not limited to the embodiments described above.

The present invention may combine the configurations described in the above-described embodiments and modified examples without departing from the spirit of the present invention, and addition, omission, replacement, and other changes of the configurations are possible. Furthermore, the present invention is not limited by the embodiments described above, but is limited only by the scope of the claims.

INDUSTRIAL APPLICABILITY

According to the protective element of the present invention, a current can be reliably cut off in the fuse element. Further, large-scale arc discharge is less likely to occur when the fuse element is fused, and the size and weight of the insulating case can be reduced. Further, it is possible to provide a protective element that can perform both overcurrent cutoff corresponding to high voltage and large current and cutoff function using a cutoff signal. Therefore, it has industrial applicability.

REFERENCE SIGNS LIST

10, 11, 260 Insulating case
20, 120, 220 Shielding member
20*a*, 120*a*, 220*a* Convex portion
20*aa*, 120*aa*, 220*aa* Tip end
30 Pressing unit
50 Fuse element
51 First end portion
52 Second end portion
60, 60A, 60B, 160A Insulating member
64, 65 Separation portion
64A, 65A Opening portion
70, 70A, 70B, 70C, 71, 170, 270 Locking member
80 Heat generating body (support member)
85 Fixing member
90, 90*a*, 90*b*, 90*c*, 90*d*, 90*e*, 90*f*, 90A Power supply member
91 First terminal
92 Second terminal
100, 200, 250 Protective element
220*a*A Fitting groove
221 First inclined blade
222 Second inclined blade
223 Protruding end
RI. Reference line
α Inclination angle
β Blade edge angle

The invention claimed is:

1. A protective element comprising:
a fuse element;
an insulating case configured to accommodate the fuse element;
a first terminal and a second terminal;
an insulating member disposed close to or in contact with the fuse element and having an opening portion or a separation portion formed therein;
a shielding member disposed above the fuse element and configured to move downward while being inserted into the opening portion or the separation portion of the insulating member to divide the fuse element;
a pressing unit configured to press the shielding member downward;
a locking member configured to restrain downward movement of the shielding member;
a heat generating body configured to heat and soften the locking member or a fixing member which fixes the locking member; and
a power supply member configured to supply a current to the heat generating body, wherein:
the fuse element has a first end portion and a second end portion disposed at both end portions in an energizing direction, one end portion of the first terminal being connected to the first end portion and another end portion of the first terminal is exposed to an outside from the insulating case, and one end portion of the second terminal being connected to the second end portion and another end portion of the second terminal is exposed to the outside from the insulating case;
the shielding member has a convex portion that protrudes toward the opening portion or the separation portion of the insulating member and the fuse element;
the convex portion has a tip end which is disposed at a lower end portion of the convex portion and extends in a width direction;
the tip end has a first inclined blade which extends downward as nearing one side in the width direction;
the first inclined blade overlaps a region which exceeds at least half of an entire length of the fuse element in the width direction when seen in an up-down direction; and
as the shielding member moves downward, at least a part of the locking member is inserted into the opening portion or the separation portion together with the convex portion.

2. The protective element according to claim 1, wherein the first inclined blade overlaps the fuse element over an entire length in the width direction when seen in the up-down direction.

3. The protective element according to claim 1, wherein the tip end further comprises:
a second inclined blade which is disposed on one side in the width direction of the first inclined blade and extends downward as nearing the first inclined blade; and
a protruding end which connects the first inclined blade and the second inclined blade and is convex downward, wherein the second inclined blade and the protruding end overlap a part of the fuse element when seen in the up-down direction.

4. The protective element according to claim 1, wherein, when seen in the energizing direction, an inclination angle of the first inclined blade with respect to a reference line which extends in the width direction is 3° or more and 27° or less.

5. The protective element according to claim 1, wherein, in a cross section perpendicular to the width direction, the tip end has a V-shape convex downward, and a blade edge angle thereof is 10° or more and 90° or less.

6. The protective element according to claim 1, wherein;

the locking member is a wire disposed above the opening portion or the separation portion and extending in the energizing direction, and supports the tip end from below;

both end portions of the locking member in the energizing direction are supported by a pair of support members;

at least one of the support members is the heat generating body; and as the shielding member moves downward, one end portion of the locking member in the energizing direction remains in a supported state, and the other end portion is released from the supported state and inserted into the opening portion or the separation portion.

7. The protective element according to claim 6, wherein;

a plurality of the locking members are provided to be arranged in a width direction; and as the shielding member moves downward, one end portion of all of the locking members in the energizing direction remains in a supported state, and the other end portion is released from the supported state and inserted into the opening portion or the separation portion.

8. The protective element according to claim 1, wherein:

the tip end further has a fitting groove provided in a lower surface of the tip end and extending in the up-down direction; and the locking member is a wire disposed above the opening portion or the separation portion and extending in the energizing direction, and is inserted into the fitting groove to support the tip end from below.

9. The protective element according to claim 8, wherein;

a plurality of locking members are provided to be arranged in the width direction;

the fitting grooves are provided in an identical number as or more than the locking members and are provided to be arranged in the width direction; and positions of upper ends of each of the fitting grooves are a same.

* * * * *